(12) United States Patent
Patel et al.

(10) Patent No.: US 9,775,008 B2
(45) Date of Patent: Sep. 26, 2017

(54) SYSTEM AND METHOD FOR ELASTIC SCALING IN A PUSH TO TALK (PTT) PLATFORM USING USER AFFINITY GROUPS

(71) Applicant: Kodiak Networks Inc., Plano, TX (US)

(72) Inventors: Krishnakant M. Patel, Richardson, TX (US); Ramu Kandula, Plano, TX (US); Brahmananda R. Vempati, Dallas, TX (US); Harisha Mahabaleshwara Negalaguli, Richardson, TX (US); Pratap Chandana, Plano, TX (US)

(73) Assignee: Kodiak Networks, Inc., Plano, TX (US)

( * ) Notice: Subject to any disclaimer, the term of this patent is extended or adjusted under 35 U.S.C. 154(b) by 0 days.

(21) Appl. No.: 14/994,844

(22) Filed: Jan. 13, 2016

(65) Prior Publication Data

US 2016/0205519 A1 Jul. 14, 2016

Related U.S. Application Data

(60) Provisional application No. 62/111,414, filed on Feb. 3, 2015, provisional application No. 62/103,404, filed on Jan. 14, 2015.

(51) Int. Cl.
*H04W 4/10* (2009.01)
*H04W 4/08* (2009.01)
*H04L 29/06* (2006.01)
*H04L 29/08* (2006.01)
*H04M 7/00* (2006.01)
*H04L 12/24* (2006.01)
*G06F 9/455* (2006.01)

(52) U.S. Cl.
CPC .......... *H04W 4/10* (2013.01); *G06F 9/45558* (2013.01); *H04L 41/12* (2013.01); *H04L 65/105* (2013.01); *H04L 67/1002* (2013.01); *H04L 67/1017* (2013.01); *H04M 7/006* (2013.01); *H04W 4/08* (2013.01); *G06F 2009/4557* (2013.01)

(58) Field of Classification Search
CPC .......... H04M 7/006; H04W 4/08; H04W 4/10
See application file for complete search history.

(56) References Cited

U.S. PATENT DOCUMENTS 7,778,655 B2 * 8/2010 Huh .................... H04L 12/1818
370/259
7,865,205 B1 * 1/2011 Lundy ............... H04M 1/72522
370/229

(Continued)

FOREIGN PATENT DOCUMENTS

EP 2184904 A1 5/2010

*Primary Examiner* — Bobbak Safaipour
(74) *Attorney, Agent, or Firm* — Slater Matsil, LLP

(57) ABSTRACT

An embodiment method includes receiving, by a first push-to-talk (PTT) service hosted on a processor, a session initiation request from a PTT client of a user and identifying, by the first PTT service, a user affinity group of the user. The user is assigned to the user affinity group in accordance with a prediction the user will communicate with first users in the user affinity group more frequently than second users in different user affinity groups. The method further includes determining, by the first PTT service, a PTT call server for the user affinity group. The PTT call server serves the user and the first users belonging to the user affinity group.

27 Claims, 11 Drawing Sheets

(56) References Cited

U.S. PATENT DOCUMENTS

| | | | |
|---|---|---|---|
| 7,933,622 B2 * | 4/2011 | Ross | H04W 4/10 455/517 |
| 8,385,964 B2 * | 2/2013 | Haney | H04W 4/08 455/404.1 |
| 8,400,953 B1 * | 3/2013 | Gunasekara | H04L 65/1069 370/296 |
| 8,433,334 B2 * | 4/2013 | Huang | G01S 5/02 342/357.4 |
| 8,483,701 B2 * | 7/2013 | Monnes | H04L 43/0894 370/338 |
| 8,577,350 B2 * | 11/2013 | Vance | H04M 1/72583 455/415 |
| 9,055,043 B2 * | 6/2015 | Suryavanshi | H04L 67/06 |
| 9,210,529 B2 * | 12/2015 | Huang | H04W 4/001 |
| 9,462,427 B2 * | 10/2016 | Patel | H04L 67/1002 |
| 2003/0153340 A1 | 8/2003 | Crockett et al. | |
| 2003/0153341 A1 | 8/2003 | Crockett et al. | |
| 2003/0161284 A1 | 8/2003 | Chen | |
| 2004/0243709 A1 | 12/2004 | Kalyanavarathan et al. | |
| 2006/0002328 A1 | 1/2006 | Naghian | |
| 2006/0014556 A1 | 1/2006 | Park et al. | |
| 2006/0030347 A1 | 2/2006 | Biswaas | |
| 2008/0175357 A1 | 7/2008 | Tucker | |
| 2008/0285487 A1 | 11/2008 | Forslow et al. | |
| 2009/0019374 A1 | 1/2009 | Logan et al. | |
| 2009/0275341 A1 | 11/2009 | Monnes et al. | |
| 2010/0167709 A1 | 7/2010 | Varadarajan et al. | |
| 2010/0284370 A1 | 11/2010 | Samar et al. | |
| 2011/0137991 A1 | 6/2011 | Russell | |
| 2011/0225277 A1 | 9/2011 | Freimuth et al. | |
| 2013/0151996 A1 | 6/2013 | Nario et al. | |
| 2013/0185667 A1 | 7/2013 | Harper et al. | |
| 2013/0196706 A1 | 8/2013 | Patel et al. | |
| 2013/0201374 A1 | 8/2013 | Timm et al. | |
| 2013/0290537 A1 | 10/2013 | Shaw | |
| 2014/0074659 A1 | 3/2014 | Chatterjee et al. | |
| 2014/0141743 A1 | 5/2014 | Shaw | |
| 2014/0214893 A1 | 7/2014 | Annapragada et al. | |
| 2014/0221035 A1 | 8/2014 | Denman et al. | |
| 2014/0317261 A1 | 10/2014 | Shatzkamer et al. | |
| 2014/0317293 A1 | 10/2014 | Shatzkamer | |
| 2014/0380041 A1 | 12/2014 | Gupta | |
| 2015/0095917 A1 | 4/2015 | Challenger et al. | |
| 2015/0288767 A1 | 10/2015 | Fargano et al. | |
| 2015/0370586 A1 | 12/2015 | Cooper et al. | |
| 2015/0381423 A1 | 12/2015 | Xiang | |
| 2016/0205519 A1 * | 7/2016 | Patel | H04L 67/1002 455/518 |

* cited by examiner

SYSTEM AND METHOD FOR ELASTIC SCALING IN A PUSH TO TALK (PTT) PLATFORM USING USER AFFINITY GROUPS

This patent application claims priority to U.S. Provisional Application No. 62/103,404, filed on Jan. 14, 2015 and entitled "Realization of Elastic Scaling for Push-to-Talk-Over-Cellular (PoC)," and to U.S. Provisional Application No. 62/111,414, filed on Feb. 3, 2015 and entitled "Realization of Elastic Scaling for Push-to-Talk-Over-Cellular (PoC)," which applications are hereby incorporated by reference herein as if reproduced in its entirety.

This patent application is related to the following and commonly assigned patent application filed on the same date: "System and Method for Elastic Scaling using a Container-Based Platform" (U.S. application Ser. No. 14/994,757, filed on Jan. 13, 2016, now U.S. Pat. No. 9,462,427), which application is hereby incorporated by reference herein as if reproduced in its entirety.

TECHNICAL FIELD

The present invention relates generally to communications over a telecommunications network, and in particular embodiments, to techniques and mechanisms for a system and method for elastic scaling in push-to-talk (PTT).

BACKGROUND

A PTT call service provides various types of call services such as one on one (1-1) calls, prearranged talk group calls, chat group calls, and adhoc group calls. Stringent call setup time restrictions and unique service usage patterns make PTT call service very different from a conventional voice over internet protocol (VOIP) call service.

In most IP network topologies, significant cost is incurred in terms of latency and core network resource usage (network address translation (NAT) ports, session border controller (SBC) sessions, etc.) when setting up an IP path between a client residing on a user device and the server. This is due to the fact that IP networks are protected by different types of demilitarized zone (DMZ) appliances, such as NAT, firewall, SBC, load balancers, etc. In such environments, it may be necessary to build in NAT/firewall traversal mechanisms using suitable protocols (e.g., session traversal utilities for NAT (STUN) and traversal using relays around NAT (TURN)), use appropriate application protocols to open interfaces on SBC, and the like. Setting up secure communication paths often involve key exchange mechanisms, which adds to the latency cost and consumes resources in network equipment used for secure sockets layer (SSL)/transport layer security (TLS) offloading. Therefore, in environments where the connection setup latency is affecting the service usability, persistent pre-established sessions between the client and PTT server can be used to avoid or at least reduce call setup delays.

With recent advances in technology, it is now desirable to deploy several services in virtualized environments that support elastic scalability and facilitate rapid deployment through agile continuous integration procedures. However, it is challenging to realize the benefits of elastic scaling by applying these methods to a PTT service because PTT services rely on persistent long-running pre-established connections and sessions for effective service delivery. Furthermore, carrier grade PTT service deployments may have stringent service availability requirements and are usually required to support geographical redundancy (e.g., geographically distributed multi-site deployments).

Further, in a distributed architecture, communications between PTT users may result in PTT pre-established session setup with different PTT call servers. Additional signaling may result to connect these users across different PTT call server instances, which causes additional latency, particularly in shared cloud infrastructure environments where the network is not specifically optimized for meeting the PTT call service requirements. For a service, like a PTT service, which has to overcome the RAN latencies and still meet the stringent sub-second call setup requirements, even milliseconds of additional latency can negatively impact service. Thus, it is desirable to organize communication paths to avoid extra hops.

SUMMARY OF THE INVENTION

Technical advantages are generally achieved, by embodiments of this disclosure which describe systems and methods for providing elastic scaling in a PTT environment.

In accordance with an embodiment, a method includes receiving, by a first push-to-talk (PTT) service hosted on a processor, a session initiation request from a PTT client of a user and identifying, by the first PTT service, a user affinity group of the user. The user is assigned to the user affinity group in accordance with a prediction the user will communicate with first users in the user affinity group more frequently than second users in different user affinity groups. The method further includes determining, by the first PTT service, a PTT call server for the user affinity group. The PTT call server serves the user and the first users belonging to the user affinity group.

In accordance with another embodiment, a push-to-talk (PTT) platform component including: a processor and a computer readable storage medium storing programming for execution by the processor. The programming includes instructions to host a session initiation protocol (SIP) proxy service, receive a SIP invite request from a PTT client of a user, and identify a user affinity group of the user. The user is assigned to the user affinity group in accordance with a prediction the user will communicate with first users in the user affinity group more frequently than second users in different user affinity groups. The programming includes further instructions to determine a PTT call server for to the user affinity group. The PTT call server serves the user and the first users belonging to the user affinity group.

In accordance with yet another embodiment, a push-to-talk (PTT) platform includes a plurality of service clusters. Each of the plurality of service clusters provides a different function, and the plurality of service clusters includes a session initiation protocol (SIP) proxy service encapsulated in a first container cluster and hosted on one or more first processors. The sip proxy service is configured to receive a session initiation request from a PTT client of a user, identify a user affinity group of the user, and determine a first PTT call server for to the user affinity group. The first PTT call server serves all users belonging to the user affinity group and assigned to a deployment site where the first PTT call server is located. The PTT platform also includes a plurality of PTT call servers. Each PTT call server of the plurality of PTT call servers is encapsulated in a second container cluster and hosted on one or more second processors. The first PTT call server is one of the plurality of PTT call servers. The PTT platform also includes a user activity tracker encapsulated in a third container cluster and hosted on one or more third processors. The user activity tracker is configured to assign the user to the user affinity group. The PTT also includes a service orchestrator configured to scale a capacity of the PTT platform in accordance with one or more PTT service metrics.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
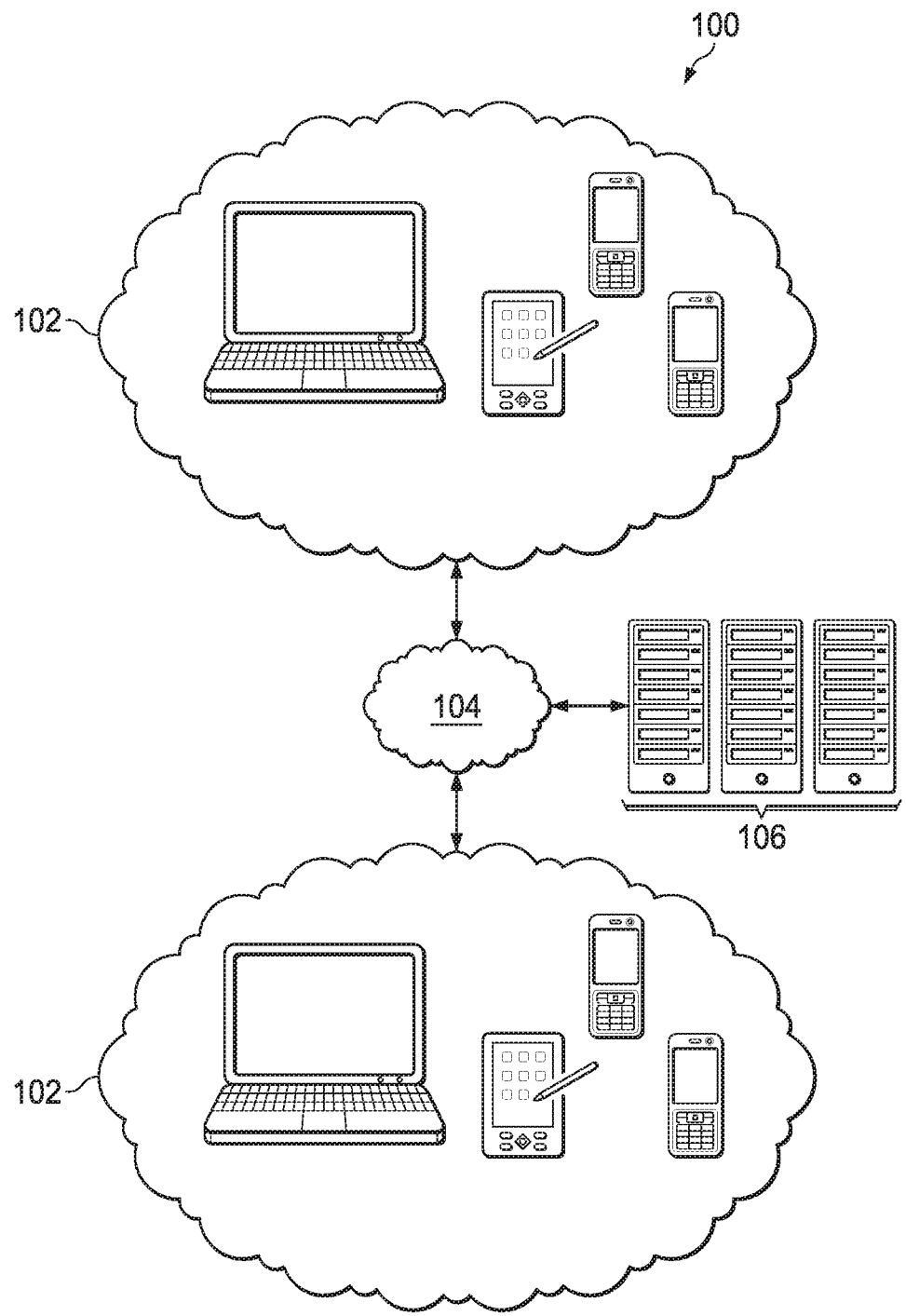
FIG. 1 illustrates a diagram of an embodiment communications network according to some embodiments.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Various embodiments are described within a specific context, namely, elastic scaling for a push to talk (PTT) system. Various embodiments may, however, be applied to other systems and networks where elastic scaling is desirable.

Various embodiments provide an architecture for realizing a virtualized, elastically scalable, highly-available, and geographically distributed PTT system that can deployed across one or more deployment sites. Various embodiments provide mechanisms to persist and recover PTT pre-established sessions, mechanisms to dynamically scale-up and scale-down the load handling capacity of the system, mechanisms to handle surge events (e.g., PTT group calls to large groups), mechanisms for balancing the PTT service load within and across different deployment sites, and the like.

Furthermore, various embodiments present a method for minimizing or at least reducing PTT call setup delays by aggregating related PTT subscribers into PTT user affinity groups and anchoring subscribers belonging to a same PTT user affinity group to a same PTT call server at a same deployment site. For example, by serving users who communicate each other frequently on a same PTT call server, the additional latency for the inter-server call setup is avoided or at least reduced.

As used herein, the term "server" may be used to reference a physical application server or a virtual application server. In embodiments where the PTT call server is a virtual server, the PTT call server service may be encapsulated in one or more containers, deployed on one or more virtual machines (e.g., a virtual compute node), and hosted on a physical infrastructure of a cloud network as described in greater detail below. In various embodiments, PTT user affinity group aggregates a group of users who may communicate with each other frequently as heuristically determined by analyzing the call patterns of various users in the system. For example, user affinity groups include a plurality of users a service on the PTT platform (e.g., a user activity tracker service) predicts will communicate with each other frequently. PTT subscribers are assigned to a PTT user affinity group, and different PTT user affinity groups may be dynamically distributed across PTT call server instances.

Various embodiment communications systems may thus achieve one or more of the following non-limiting features and/or advantages: virtualization and scalability; massively scalable cloud-compatible platform supporting multi-site deployments, dynamic load-balancing, and elastic scalability; flexible deployments across different cloud environments including a carrier's private cloud infrastructure; use of Software Defined Networking (SDN) and optimized or at least improved Network Function Virtualization (NFV); resilience and operational efficiency; self-healing service logic to automatically or semi-automatically recover from component failure; simple and efficient operational procedures to ensure carrier grade service for various subscribers; automated zero-downtime (or at least reduced downtime) rolling upgrade; and facilitating agile continuous integration processes for faster rollout of new features.

FIG. 1 illustrates a communications system 100, which provides an architecture for supporting a PTT communications solution in accordance with some embodiments. Communications system 100 includes client devices 102, a communications network 104, and a PTT platform 106. As used herein, the term "client device" refers to any component (or collection of components) capable of establishing a connection with a communications network, such as a user equipment (UE), a mobile station (STA), a cellular phone, a tablet, a laptop, and other wirelessly enabled devices. Applications (referred to hereinafter as "PTT clients") reside on client devices 102 for accessing various PTT functions.

Client devices 102 may communicate with PTT platform 106 over network 104 (e.g., the Internet, an IP network, or the like), which may be accessed by client devices 102 through a cellular network deployed by a carrier, a WiFi network, a radio access network (RAN), other wireless networks, a wired IP network, combinations thereof, or the like. Network 104 may include one or more components configured to provide wireless or wired network access, such as an enhanced base station (eNB), a macro-cell, a femtocell, a Wi-Fi access point (AP), combinations thereof, or the like. Furthermore, network 104 may operate in accordance with one or more wireless communication protocols, e.g., open mobile alliance (OMA), long term evolution (LTE), LTE advanced (LTE-A), High Speed Packet Access (HSPA), Wi-Fi 802.11a/b/g/n/ac, etc. In some embodiments, network 104 may comprise various other devices, such as relays, low power nodes, etc. Network 104 may further include backhaul network components, such as various gateways, routers, controllers, schedulers, and the like.

Subscribers to PTT solution (e.g., users operating client devices 102) may be provisioned onto system 100 via interfaces to carriers (e.g., cellular carriers). PTT customers (e.g., enterprises) can administer these subscribers to form closed groups for PTT communications. The PTT solution may interface with the carrier, for example, by including connectivity to the carrier's core network, billing interfaces, provisioning interfaces, lawful intercept interfaces, customer care interfaces, and the like. PTT platform 106 may provide a plurality of PTT functions to client devices 102 through the PTT clients on client devices 102 as described in greater detail below.

In some embodiments, PTT platform 106 uses container technology for virtualization of a PTT system architecture, such as, the virtualization of provided PTT services. Example container technologies may include Docker, Rocket, LXD, and the like although the architecture is not limited to a specific container technology. Virtualization using container technology may allow PTT platform 106 to adopt a micro-services model in which service clusters are considered the building blocks of the system architecture. For example, each function provided by PTT platform 106 may be virtualized in a unique service cluster, and each service cluster may perform a different function in PTT platform 106. The PTT System architecture includes a collection of independent service clusters that communicate with each other through pre-defined interfaces to fulfill service work flows. Decomposition of the system into a set of services allows each service (e.g., each function provided by the PTT platform) to be independently deployed and managed. Thus, system resilience may be improved as failures are localized to individual services. Furthermore, rapid and agile deployment of services may also be achieved.

In some embodiments, PTT platform 106 incorporates distributed databases, clustering technologies, data analytics tools, and high performance messaging middleware to provide a robust, scalable platform. PTT platform 106 may use fully virtualized components with layered approach to service orchestration, which allows PTT platform 106 to be integrated into various cloud environments, such as a carrier's private cloud infrastructure, a dedicated PTT cloud infrastructure, combinations thereof, and the like.

In some embodiments, PTT platform 106 uses container technology for virtualization. In an embodiment cloud environment that provides container level orchestration Application Program Interfaces (APIs), PTT platform 106 may directly use the container level orchestration APIs to instantiate service containers as needed. In other cloud environments without container level orchestration APIs, PTT platform 106 may provide its own container management layer that is built on top of a virtual machine management layer. This approach allows PTT platform 106 to provide a single container based execution environment to various service components irrespective of the physical deployment environment of PTT platform 106. Thus, PTT platform 106 decouples infrastructure deployment considerations from service deployment. An embodiment layered infrastructure management architecture of a PTT platform 106 is illustrated in FIG. 2.

Figure 2:
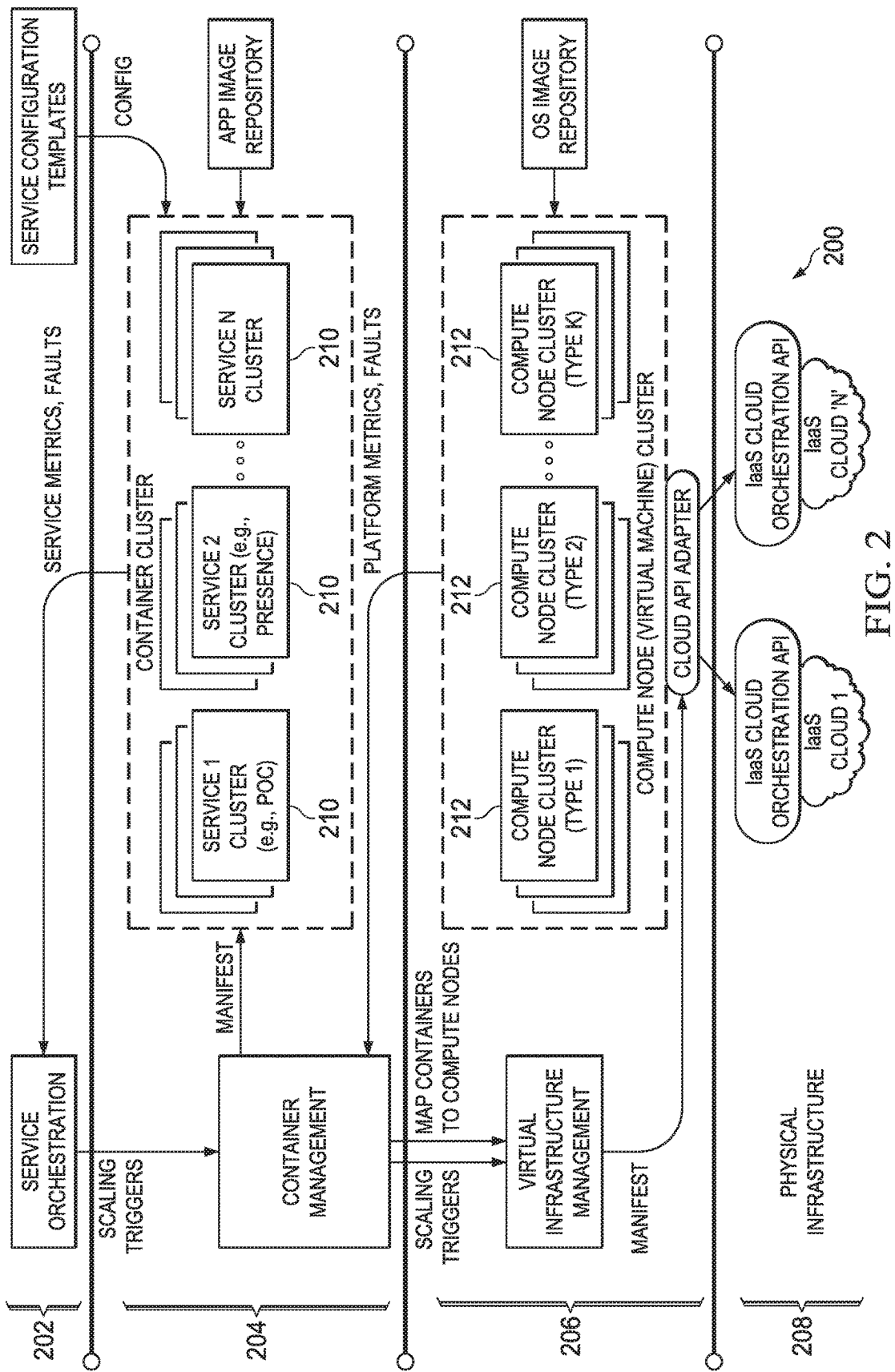
FIG. 2 illustrates a block diagram of infrastructure management in a PTT platform according to some embodiments.

As illustrated by FIG. 2, PTT platform 106's infrastructure management architecture 200 includes a service orchestration layer 202, a container management layer 204, a virtual infrastructure management layer 206, and a physical infrastructure layer 208. Each layer may include a controller, such as a virtual controller hosted on a processor for performing the various functions provided by the layer, a dedicated hardware controller, and the like. In an embodiment, the controllers of each layer are setup as part of a bootstrap procedure for the platform. These controllers may be hosted on dedicated physical hardware or on one or more virtual compute node instances of physical infrastructure layer 208. In embodiments where the controllers are hosted on physical infrastructure layer 208, specific hardware resources may be reserved for the purpose of hosting the controllers.

Service orchestration layer 202 is the highest layer of abstraction in infrastructure management architecture 200. Service orchestration layer 202 is a layer on top of which various service components that constitute the PTT System operate. A service orchestrator in service orchestration layer 202 uses service metrics to scale service clusters 210 (e.g., groups of containers may be referred to collectively as a container cluster) for each service component (e.g., the various service components illustrated in FIG. 3, below). Scaling service clusters 210 may include transmitting scaling triggers to lower layers (e.g., container management layer 204). In some embodiments, the scaling of service clusters 210 may be in real time. These scaling triggers may be based on service metrics transmitted to service orchestration layer 202 from lower layers (e.g., container management layer 204). Embodiment service metrics for a PTT platform may include, for example, number of PTT pre-established sessions, PTT call setup rate, PTT call leg setup rate (e.g., latency), number of concurrently active PTT calls, number of concurrently active PTT call legs, number of media codec instances in active use, combinations thereof, and the like. Service orchestration layer 202 may also create new container instances to replace failed container instances, for example, based on faults transmitted to service orchestration layer 202 from lower layers (e.g., container management layer 204).

Container management layer 204 operates on top of a pool of virtual machines (e.g., compute nodes 212 in virtual infrastructure management layer 206) to manage the distribution of services clusters 210 across various compute nodes 212. For example, container management layer 204 may manifest container instances for each service cluster 210 across compute nodes 212. In some embodiments, container management layer 204 tracks platform metrics (e.g., computer processing unit (CPU) metrics, random access memory (RAM) metrics, combinations thereof, and the like) across various virtual machines and uses these metrics to distribute the service container load (e.g., service clusters 210) across compute nodes 212. Container management layer 204 may instantiate new compute nodes to scale the system when needed based on the platform metrics. For example, container management layer 204 may transmit scaling triggers to virtual infrastructure management layer 206 to instantiate new compute nodes or to remove compute nodes as desired. In some embodiments, container management layer 204 may also transmit desired compute node profiles with the scaling triggers to virtual infrastructure management layer 206.

Container management layer 204 may ensure a desired redundancy in the system by distributing container instances belonging to a same service component across multiple compute nodes. Container management layer 204 also triggers the creation of new compute nodes to replace failed instances. Container management layer 204 further manages compute node clusters with different profiles (e.g., CPU, RAM, storage, network input/output (I/O) capacity, and the like), and container management layer 204 places service clusters 210 on compute nodes 212 with a suitable profile. Container management layer 204 may also enforce container affinity policies to ensure that related container groups (e.g. a PTT server and a media server) are co-located on the same host. Platform design may determine which container groups (e.g., which service clusters) should be may be related. For example, when there is a relatively high probability of intercommunication between container groups (e.g., a PTT call server and a PTT media server during a PTT call), placing these container groups together on the same host will reduce latency (e.g., the latency of PTT call setup and floor control operations).

Virtual infrastructure management layer 206 provides a bridge between orchestration layers (e.g., service orchestration layer 202 and container management layer 204) and the physical infrastructure (e.g., physical infrastructure layer 208) of the PTT platform. Virtual infrastructure management layer 206 provides an abstract interface to the physical cloud infrastructure and allows PTT platform 106 to be ported to different cloud environments.

In some embodiments, virtual infrastructure management layer 206 executes scaling triggers received from container management layer 204 and uses the underlying cloud infrastructure management APIs (e.g. OpenStack) to build up compute nodes (e.g., compute nodes 212) with a requested profile. In some embodiments, the requested profile may include a combination of CPU, RAM, storage, network input/output (I/O) capacity, and the like as requested by container management layer 204.

Physical infrastructure layer 208 can be provided as part of carrier's private cloud, a public cloud, or a combination thereof. Physical infrastructure layer 208 is a physical implementation of virtual infrastructure management layer 206. And various PTT services are encapsulated in containers and hosted on physical hardware components (e.g., processors) in physical infrastructure layer 208. In some embodiments, physical infrastructure layer 208 may use commercially available off-the-shelf (COTS) components, which may allow the implementation of PTT platform 106 without specialized hardware. Furthermore, physical infrastructure layer 208 may be capable of spanning multiple datacenters at different sites to provide geographic redundancy for greater resiliency.

Figure 3:
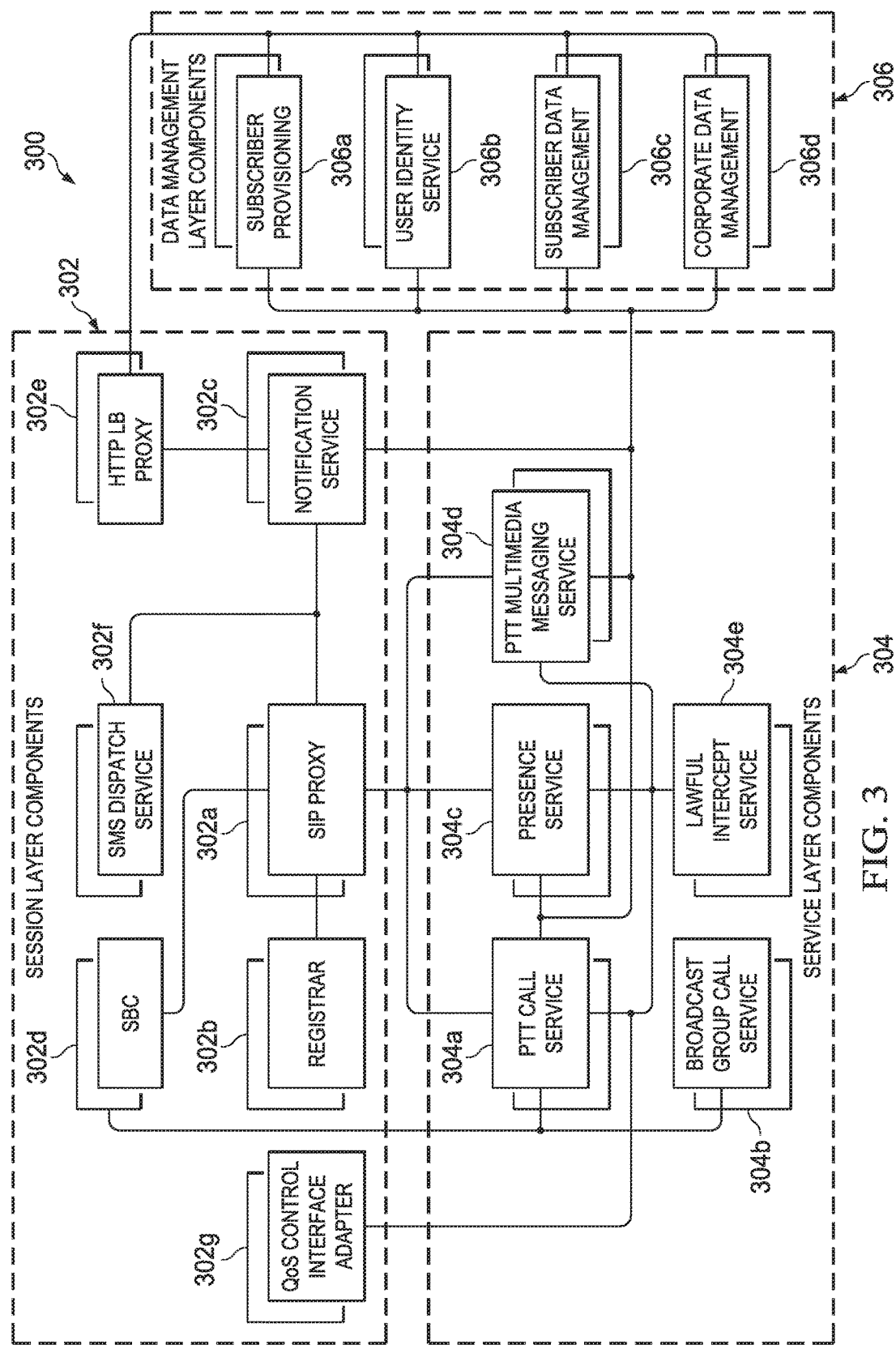
FIG. 3 illustrates a block diagram of various service components in the PTT platform according to some embodiments.

FIG. 3 illustrates a block diagram of service components 300 according to some embodiments. Each service components 300 may be virtualized as a unique service cluster 210, distributed on virtual compute nodes 212, and implemented on a private/public cloud platform as described above with respect to FIG. 2. Service components 300 may be organized in one or more functional layers, such as a session layer 302, a service layer 304, and a data management layer 306.

In an embodiment, session layer 302 may include a session initiation protocol (SIP) proxy service 302a, a registrar service 302b, a notification service 302c, a session border controller (SBC) service 302d, a HTTP proxy service 302e, SMS dispatch service 302f, a quality of service (QoS) control interface adapter 302g, or a combination thereof. SIP proxy service 302a may route SIP traffic to corresponding services (e.g. call service, presence service, and the like); serve as a SIP load balancer; offload the client connection management from the backend services; enable all services to reach the client through a common connection; or a combination thereof. Registrar service 302b may maintain client connectivity information in a database (DB) that is shared with all (or at least a subset of) other services. The other services can use this data to route SIP messages to client via an appropriate SIP proxy instance. Registrar service 302b may also track the status of the proxy elements and identify/recover stale client sessions connections in the event of a proxy element failure. Notification service 302c allows all (or at least a subset of) services to send asynchronous notifications to clients via different mechanisms such as SIP, short message service (SMS), email, and the like. In some embodiments, clients may maintain an always-on transport path with the notification service for SIP notification reception. SBC service 302d receives traffic entering into the PTT System from the internet protocol (IP) multimedia subsystem (IMS) core. SBC service 302d provides SIP application level gateway (ALG) and Media network address translation (NAT) functions. HTTP proxy service 302e may receive some or all HTTP traffic relating to provisioning, corporate data management, and client data management. SMS dispatch service 302f is used by notification service 302c to send SMS notifications related to the user's PTT service to the client. Some examples of the SMS notifications include service activation and deactivation messages, service maintenance alerts, and the like. QoS control interface adapter 302g provides a customizable interface to carrier's QoS control system (e.g. policy and changing rules function (PCRF) receive (Rx) interface) for implementing dynamic QoS control logic.

In an embodiment, service layer 304 may include PTT call session service 304a, broadcast call service 304b, presence service 304c, PTT multimedia messaging service 304d, lawful intercept service 304e, or a combination thereof. PTT call service 304a provides an entry point to all (or at least a subset of) call services to PTT platform 106. PTT call service 304a manages PTT pre-established sessions, for example, by handling one-on-one (1-1), pre-arranged group and adhoc group calls over on-demand and pre-established sessions. PTT call service 304a also implements predictive wakeup technology (e.g., as described in U.S. Pat. No. 8,478,261, entitled "Predictive Wakeup for Push-To-Talk-Over-Cellular (PoC) Call Setup Optimizations," patented Jul. 2, 2013, which application is hereby incorporated by reference) to deliver faster call setup times. Broadcast call service 304b implements a broadcast call service using the PTT call services. Broadcast call service 304b implements staggered delivery algorithms to provide real-time delivery to as many users as possible while avoiding Radio Access Network (RAN) congestion and overloading of PTT call service component. Presence service 304c implements presence and location services. Presence service 304c utilizes a notification service 302c for delivery of presence and location information effectively using RAN friendly algorithms. PTT multimedia messaging service 304d provides various messaging services such as instant personal alerts, geo-location tagged text, multi-media messaging, and the like. Lawful intercept service 304e implements the lawful intercept services for all other PTT services based on various regulatory requirements.

In an embodiment, data management layer 306 may include subscriber provisioning service 306a, user identity management service 306b, subscriber data management service 306c, corporate data management service 306d, or a combination thereof. Subscriber provisioning service 306a is used to manage a subscriber lifecycle in the PTT platform 106. It provides subscriber and account management APIs to manage subscribers individually and/or in batches. User identity management service 306b provides various mechanisms such as Short Message Service (SMS), email, OAuth, Security Assertion Markup Language (SAML), and the like to verify various user identities. Subscriber data management service 306c provides APIs to various clients to configure client data (e.g., contacts, groups, call policies, and the like) as desired for using various PTT System services. Corporate data management service 306d provides APIs to enable corporate administrators to setup contact lists and groups for the subscribers belonging to each corporation's account.

Although FIG. 3 illustrates specific service components, an embodiment PTT platform may include any combination of the above components. Other service components may also be included in an embodiment system depending on platform design.

Figure 4:
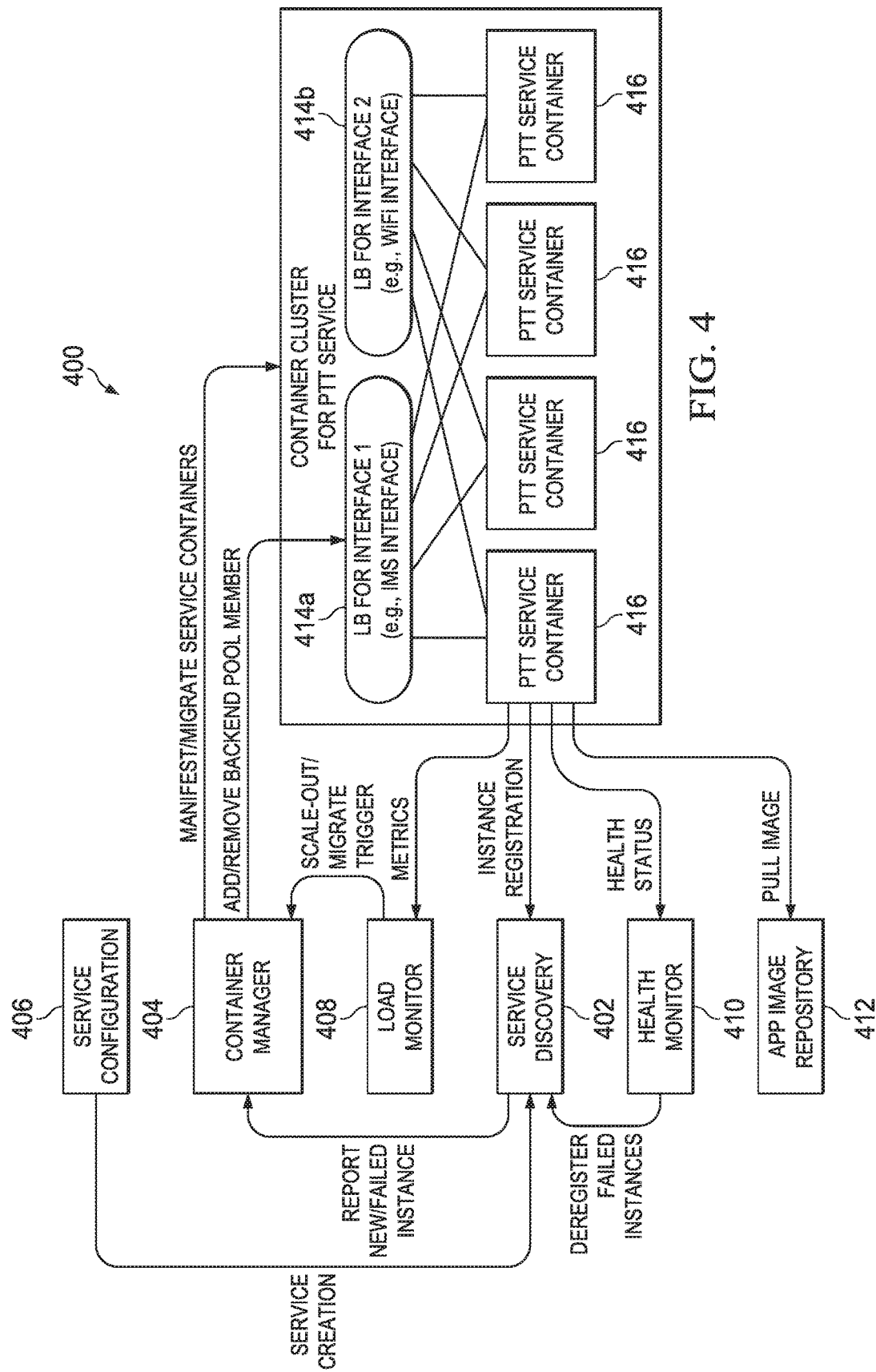
FIG. 4 illustrates a block diagram of interactions between layers in a PTT platform according to some embodiments.

FIG. 4 illustrates a block diagram 400 of interactions between various service orchestration and container management modules/layers in an embodiment PTT system platform (e.g., PTT platform 106). In some embodiments, service cluster management is function of service orchestration. As part of service cluster management, PTT platform 106 may perform one or more of the following non-limiting functions: service instantiation and configuration, automatically scaling the system based on one or more capacity indicators, automatically updating a load balancer pool when new pool members are added or removed, and migrating containers from one host (e.g., a virtual compute node) to another when a host is overloaded.

As illustrated by FIG. 4, PTT platform 106's service orchestration and container management modules includes a service discovery module 402, a container manager 404, a service configuration module 406, a load monitor 408, a health monitor 410, and an app image repository 412. The various modules interact with load balancers in order to manage various service containers 416. Load balancers in telecommunications services platform 106 may be interface specific, and telecommunications services platform 106 may include a load balancer 414a for an IMS interface, a load balancer 414b for a WiFi interface, combinations thereof, and the like.

When new service containers 416 are created and the application comes up successfully (e.g., when the application is initialized and has opened all its interfaces), the service containers 416 register their availability with the service discovery module 402. Each service container 416 may be part of a service cluster to provide a PTT service as described with respect to FIGS. 2 and 3, above. Service discovery module 402 may also detect when a service container 416 fails. When a new service container 416 is registered, service discovery module 402 executes logic to allow the interfaces of the new service container 416 to be discoverable by the other components (e.g., other containers and modules) in the system. Depending on the service, the discoverability of a new service container may be restricted to the local site of the new service container, or the discoverability may span across different sites.

Container manager 404 encapsulates service specific orchestration logic for various service components in the PTT platform. Container manager 404 creates new container instances based on scaling triggers received from load monitor 408 and/or service fault events received from service discovery module 402. When instantiating a new service container 416, container manager 404 may also instantiate other containers and configure other services (e.g., load balancers) to support the new service container 416. In some embodiments, container manager 404 ensures that the service containers 416 of a service cluster are distributed across different compute nodes (e.g., virtual compute nodes 212, see FIG. 2) in order to provide a desired redundancy (e.g., 'K' redundancy). Container manager 404 may also distribute service containers 416 across different available compute nodes (e.g., virtual compute nodes 212, see FIG. 2) to balance the container load.

Service configuration module 406 provides a generic template based configuration for various services. When a new component (e.g., a new service container 416) is instantiated, the component pulls a required service configuration from a corresponding template of a service cluster the component belongs to. In order to support automatic elastic scalability, all elements in a service cluster may operate using an identical service configuration. Thus, by using such templates, service configuration module 406 may also ensure that any changes to the service configuration of a cluster are automatically propagated to all the service cluster elements in the cluster.

Load monitor 408 is part of the real-time analytics system. Load monitor 408 may use various metrics received from service containers 416 to determine capacity indicators for each service container 416. Load monitor 408 may then generate scaling triggers based on the analysis of these capacity metrics. For some services, capacity indicator metrics may include CPU usage, RAM usage, and the like. Load monitor 408 may also monitor other metrics for other services such as media sessions, number of active SIP dialogs, transaction throughput, and the like in order to determine system load.

Load monitor 408 may also track various virtual machines (e.g., compute nodes) to see if a virtual machine is overloaded due to load skew. When overloading due to load skew is detected, load monitor 408 may trigger container manager 404 to migrate service containers 416 from the overloaded host virtual machine to another virtual machine having spare capacity. In order to support smooth container migration, applications in the service containers 416 may support a drain state in which the applications exit gracefully after completing existing tasks or migrating all existing tasks.

Various service containers 416 periodically report their health status to the health monitor 410. The services containers 416 may ensure internal subsystems and interfaces in a container are functional by using appropriate internal diagnostic mechanisms. When a service container fault is detected, health monitor 410 propagates the fault information to service discovery module 402 and container manager 404 in order to trigger various recovery functions. For example, service discovery module 402 may de-register failed instances and create new replacement instances.

App image repository 412 stores the application container images for various services components. When manifesting a new container instance, a required image is automatically pulled from App image repository 412 for the container.

Various embodiments implement a scalability model for PTT communications. As described earlier, service components are implemented as a cluster of application server containers, and the service load is distributed among various cluster elements. In various embodiments, application servers may receive one or more of the following types of traffic through one or more interfaces: client/user initiated traffic, Peer-to-Peer traffic across various components, and asynchronous tasks. Client/user initiated traffic may include long sessions such as PTT pre-established sessions, short sessions such as PTT calls, transactional load traffic (e.g., data management, presence state updates, etc.), combinations thereof, and the like. Peer-to-Peer traffic may include traffic between different service components (e.g., between different service clusters, such as between a presence service and a notification service as part of the service execution flow), between same components (e.g., between a same service cluster) to transmit information across stateful sessions managed by different instances (e.g. a PTT call between two clients whose PTT pre-established sessions are connected to different PTT servers), combinations thereof, and the like. Asynchronous tasks may include session refresh/expiry, data audits, combinations thereof and the like. Embodiment load balancing schemes for different types of traffic handled by the application server containers in a PTT system are described below with respect to FIGS. 5 and 6 below.

Figure 5:
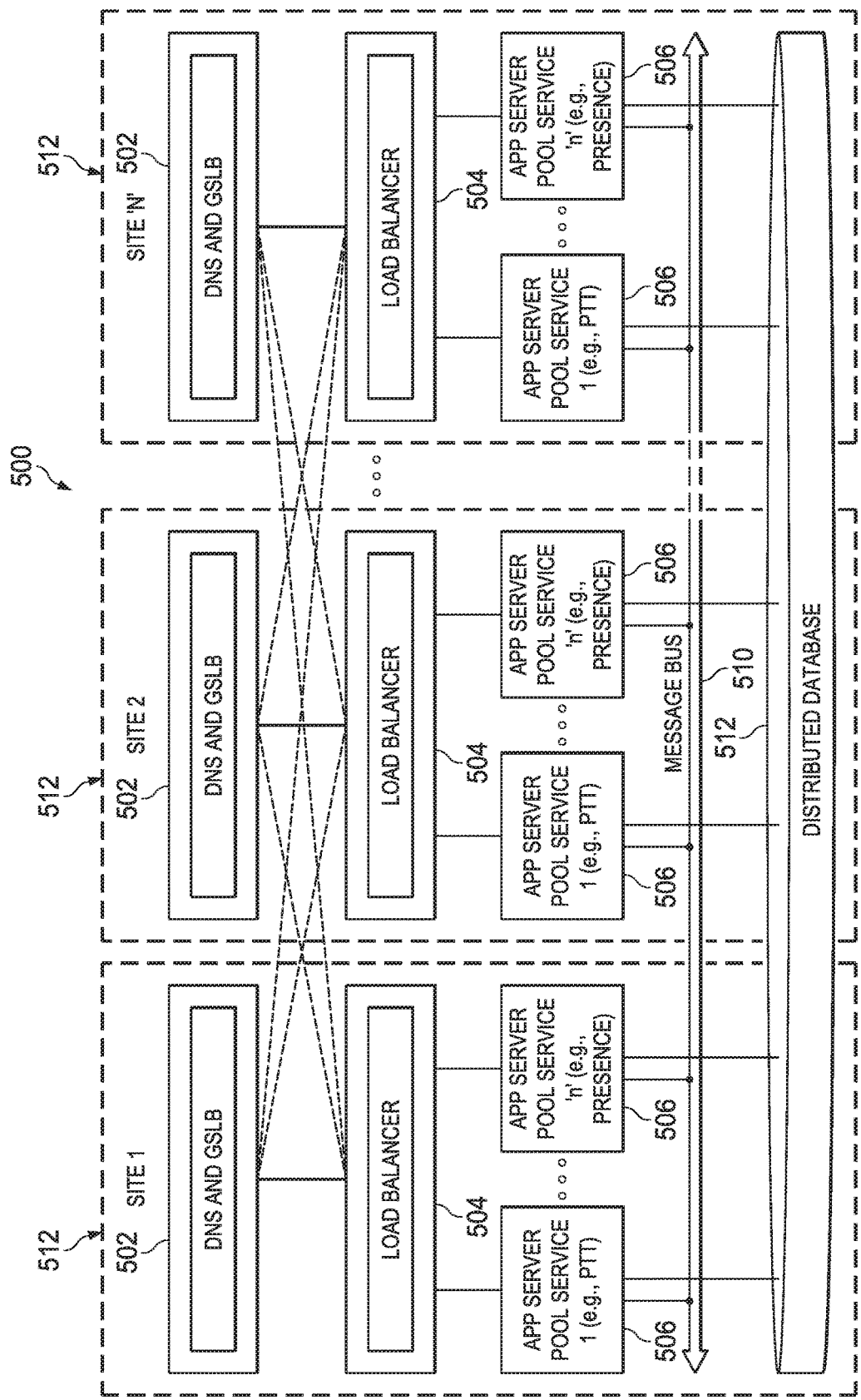
FIGS. 5 and 6 illustrate a block diagrams of a load balancing schemes for PTT communications according to some embodiments.

FIG. 5 illustrates a load balancing model 500 for the client/user initiated traffic. In an embodiment, all traffic originating from outside the PTT System may first be dynamically distributed across multiple deployment sites 512, which may be achieved using Domain Name System (DNS) based Global Server Load Balancing (GSLB). PTT clients are provided Fully Qualified Domain Names (FQDNs) for various services provided by PTT System. A DNS-GSLB component 502 at each deployment site 512 serves as the domain authority for these FQDNs. On performing a DNS query for these FQDNs, DNS-GSLB component 502 returns the IP address that is selected for the PTT client based on a configured geographical load distribution policy. In an embodiment, the geographical load distribution policy may be based on geographic proximity. For example, DNS-GSLB component 502 can be configured to direct the traffic to a geographically nearest deployment site 512 based on an originator's IP address. In another embodiment, the geographical load distribution policy may be based on a weighted round robin policy. For example, DNS-GSLB distributes the traffic to various deployment sites 512 in the proportion of the weightage assigned to each site. In an embodiment a weight assigned to each of the plurality of geographically diverse deployment sites is proportional to an available spare load bearing capacity of a respective one of the plurality of geographically diverse deployment sites. In such embodiments, some deployment sites 512 may be larger than the other sites 512. Other load distribution policies may also be used in other embodiments.

In some embodiments, the DNS query is performed based on the system receiving a SIP REGISTER request from a PTT client for a session. Once a deployment site 512 is selected for serving the SIP REGISTER request from a PTT client, that deployment site 512 is considered the 'home' site for the duration of that session. In some embodiments, all services used by the client are provided from the same home site, and a SIP path information may be returned in a REGISTER response to the requesting PTT client. The PTT client uses this SIP path information to direct all subsequent SIP service requests to the home site. Similarly, a PTT client may be provided site specific route information as part of the login session establishment procedure for other services.

Within each deployment site, all service requests from PTT clients are directed through load balancers 504, which distribute traffic to corresponding service clusters 506. As described above, each service cluster 506 includes one or more containers and may provide a different PTT service. Application servers on service clusters 506 may communicate and share information using a common message bus 508 and distributed database 510. Load balancers 504 support server stickiness for session based workloads such as PTT pre-established sessions, chat group sessions, subscribe dialogs etc. For example, load balancers 504 may maintain session based workloads on a same server when possible. Transactional workloads such as messaging, presence updates, and the like may be equally distributed across service clusters 506.

Unlike load balancing for PTT client-initiated traffic where a load balancing proxy component serves as the entry point for session requests, one or more different load balancing strategies may be used for internal traffic between various elements within a service cluster and between different service clusters. The load balancing strategies used by various service components for this type of traffic may include a load balancer proxy, an internal DNS round robin, load balancing through messaging middleware, or a combination thereof. An embodiment load balancer proxy may be similar to the PTT client traffic load balancing scheme described above with respect to FIG. 5. Traffic is routed through a load balancing proxy, which distributes the traffic to pool members of the service cluster and also implements session stickiness if desired for that service.

Figure 6:
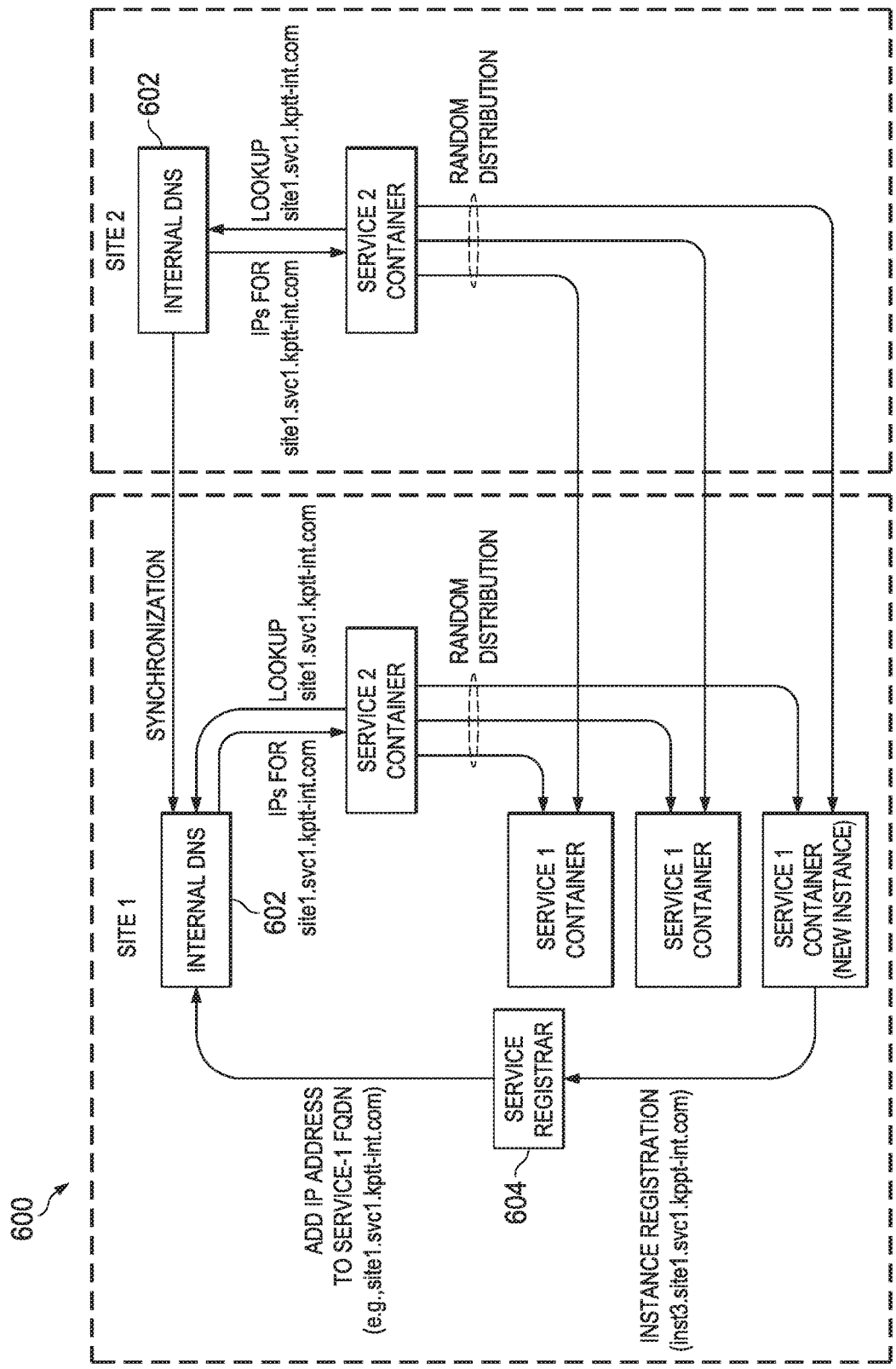

FIG. 6 illustrates a load balancing scheme 600 for an internal DNS round robin load balancing scheme. In this scheme, each service cluster in the PTT platform is provided with unique deployment site level FQDNs. An example format for the site level FQDNs may be: "site1.svc1.kptt-int.com". As part of service registration procedure, a new container associates its interface IP address with the FQDN of the container's service cluster. Thus, the new container element becomes visible to other service elements (e.g., other service clusters), and the container will receive a proportionate share of the Peer-to-Peer traffic through DNS round robin. For example, when a component wishes to send a message to a peer component, the component queries an internal DNS 602 to obtain a list of active IPs for that service and randomly picks one of the IP addresses from the returned pool of IPs. Service discovery module 604 may automatically remove the IPs of failed components from DNS 602 and ensures that no traffic is directed towards an unresponsive or failed component.

Load balancing through messaging middleware may include service components using a distributed message oriented middleware to obtain benefits of load balancing logic provided by a message bus. A service cluster binds to a share message queue, and the messaging middleware distributes traffic to various elements. If some elements are lagging, the lag may manifest as a growing queue size, and the messaging middleware may automatically throttle the traffic directed towards that element until the queue size is reduced.

Figure 7:
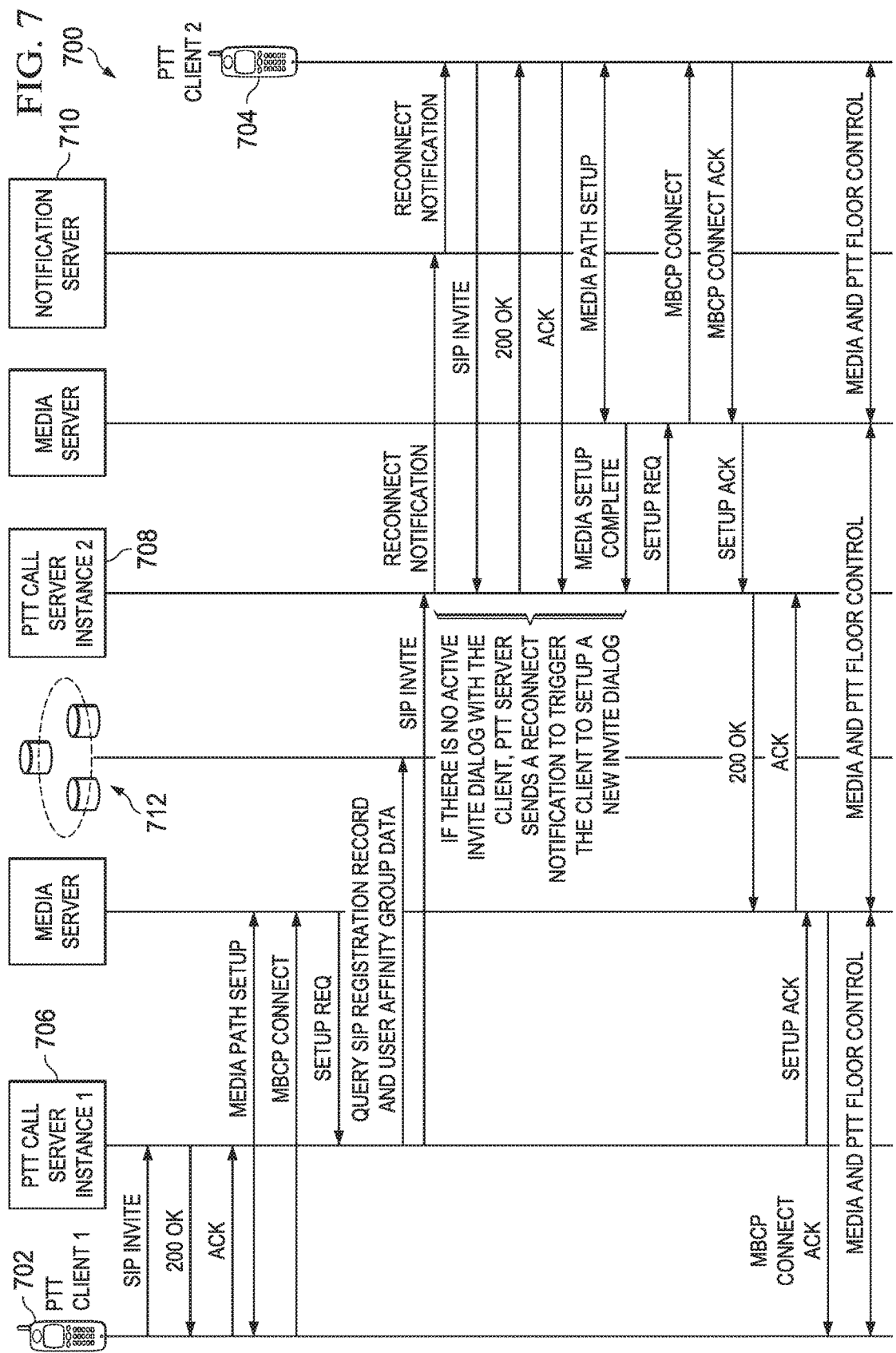
FIG. 7 illustrates a block diagram of transmissions of a session initiation protocol for PTT communications according to some embodiments.

FIG. 7 illustrates session initiation protocol according to some embodiments. An embodiment PTT platform may support SIP INVITE dialogs and call signaling for session initiation. For example, a PTT client may transmit a SIP INVITE dialog to initiate a call session. Other call session initiation requests may also be used. An embodiment INVITE dialog (either pre-established or on-demand) from a PTT client is not necessarily limited to serving a single PTT call. An embodiment active INVITE dialog may be used to serve multiple PTT calls through the same media path. For example, instead of being terminated as soon as a PTT call is completed, an INVITE dialog is retained for handling subsequent PTT calls involving the PTT client. INVITE dialogs are PTT client specific where each PTT client uses a separate INVITE dialog. Depending whether the INVITE dialog is for a pre-established session or on-demand session, a configurable inactivity timer may be used to govern how long the INVITE dialog is retained when there is no media activity in that session.

FIG. 7 illustrates messaging flow 700 setting up an embodiment PTT call session. Messaging flow 700 supports INVITE dialog setup from an originating PTT client 702 and INVITE dialog setup for a terminating PTT client 704. Messaging flow 700 is applicable for pre-established and on-demand INVITE dialogs for both originating PTT client 702 and terminating PTT client 704. Because an INVITE dialog can serve multiple calls, successful setup of the INVITE dialog on both PTT clients 702 and 704 may not be sufficient to complete call setup. Additional signaling may be performed for call setup separately on a media path (e.g., a Real-time Transport Control Protocol (RTCP)) using a Media Burst Control Protocol (MBCP), for example, as specified in OMA 2.1 standards.

In messaging flow 700, a terminating PTT call server 708 uses a notification server 710 to trigger the terminating PTT client 704 to setup an INVITE dialog when there is no active INVITE dialog with PTT client 704 for processing a terminating call event. For example, when terminating PTT call server 708 receives an SIP INVITE from originating PTT client 702, terminating PTT call server 708 determines if there is an active INVITE dialog established with terminating PTT client 704. If no active INVITE dialog is found, terminating PTT call server 708 may trigger the creation of such an INVITE dialog with terminating PTT client 704 through notification server 710.

Furthermore, in messaging flow 700, the originating PTT call server 706 may use SIP registration data and user affinity group data (e.g., obtained from a user affinity group database or manager 712) to identify which PTT server in a PTT system is responsible for handling a terminating leg of a session. For example, originating PTT call server 706 may use SIP registration data and/or user affinity group data to select an appropriate terminating PTT call server 708 from available PTT servers in the PTT system. Even though the terminating leg is shown in FIG. 7 as being handled by a separate PTT call server 708, terminating PTT call server 708 may be a same server as originating PTT call server 706. Alternatively, terminating PTT client 704 may be registered with a different call server, and originating PTT call server 706 will route the terminating leg of a session through that server.

Messaging flow 700 in FIG. 7 may be simplified for brevity. For example, a SIP Proxy and network interface layer components has been omitted from FIG. 7 for brevity. An embodiment session set-up message flow may include any number of additional messages with any number of additional components depending on platform design.

Various embodiments implement user affinity groups for efficient handling of PTT calls. In various embodiments, all subscribers belonging to a user affinity group within a deployment site are served by same PTT Call Server in that site as illustrated by block diagram 800 of FIG. 8. In another embodiment, the PTT clients of users belonging to a same user affinity group may span multiple deployment sites, for example, when geographic proximity is used to determine a user's home site as described above. As shown in the 1-1 PTT call flow in FIG. 7, additional inter-server communication is required to set up a PTT call between users who are connected to different PTT Call Server instances. By using PTT user affinity groups, PTT call setup time is optimized (or at least improved) by ensuring that no additional latency is incurred by inter-server communication for connecting all the parties involved in a PTT call.

Figure 8:
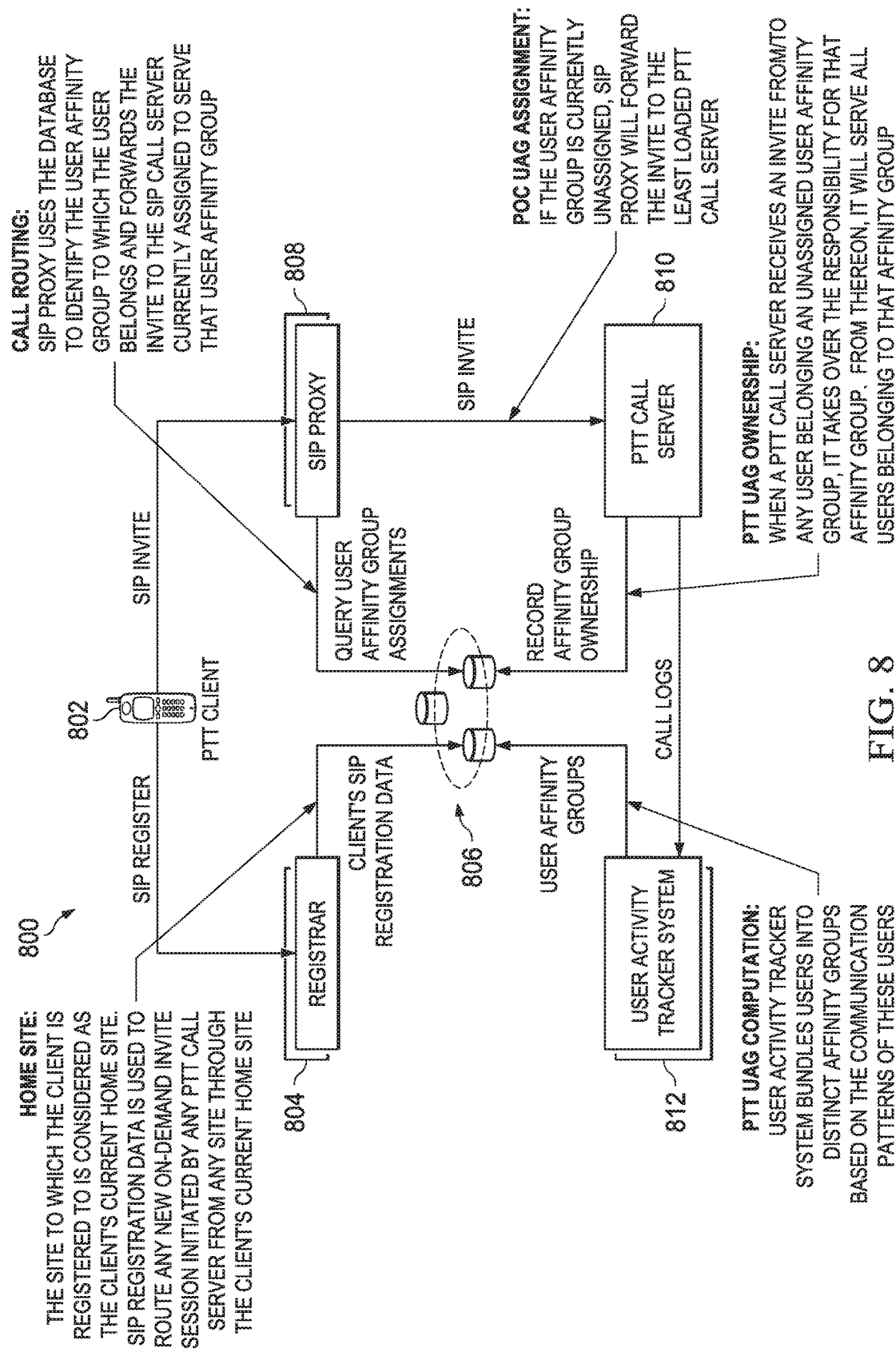
FIGS. 8, 9, and 10 illustrate a block diagrams of user affinity group deployment and usage for PTT communications according to some embodiments.

Referring to FIG. 8, a PTT client 802 may transmit a registration request (e.g., a SIP REGISTER) to a registrar 804. As discussed above with respect to FIG. 4, a DNS query may be performed, and a deployment site is selected to fulfill the SIP REGISTER request. The deployment site with which PTT client 802 is registered is considered PTT client 802's home site. SIP registration data may be transmitted to a user affinity group database 806 to route any new on-demand INVITE session for PTT client 802 initiated by any PTT call server from any site through PTT client 802's home site. In some embodiments, a home is selected for PTT client 802 in accordance with a geographic proximity of PTT client 802 to various deployment sites of the PTT platform. In some embodiments, a home is selected for PTT client 802 in accordance with a weighted round robin algorithm as described above.

When PTT client 802 sends a session initiation request (e.g., an SIP INVITE dialog), a SIP proxy 808 queries a user affinity group database 806 to identify the user affinity group to which PTT client 802 belongs. In various embodiments, PTT client 802 is more likely to communicate with users in its user affinity group than other users belonging to different user affinity groups. The SIP proxy 808 may then forward the INVITE dialogue to the PTT call server currently assigned to serve the applicable user affinity group. If the user affinity group is not currently assigned to any PTT call server, SIP proxy 808 may select a PTT call server for the user affinity group based on the current load factor of various servers in the PTT system. For example, SIP proxy 808 may select a PTT call server for the user affinity group based on the processing load of all PTT call server instances in the deployment site at the time of assigning the user affinity group. In such embodiments, processing load of a PTT call server is dynamically determined using the one or more performance indicator metrics, such as, PTT call setup latency, number of active pre-established PTT sessions, number of active PTT calls, number of active PTT call legs, number of media codec resources in active use, and the like.

Furthermore, SIP proxy 808 may trigger the creation of a new PTT call server when none of the call servers at the deployment site have sufficient capacity to serve the user affinity group (e.g., when all PTT call servers currently deployed at the deployment site are at maximum capacity). In such embodiments, SIP proxy 808 may signal a service orchestrator, which creates a new PTT call server for the deployment site. SIP proxy 808 may then assign the user affinity group to the new PTT call server.

In FIG. 8, the PTT call server assigned to the user affinity group is designated as PTT call server 810. When PTT call server 810 receives an SIP INVITE from or to any user belonging to an unassigned user affinity group, PTT call server 810 takes over responsibility for the user affinity group. Afterwards, PTT call server 810 may serve all users belonging to the user affinity group.

Figure 9:
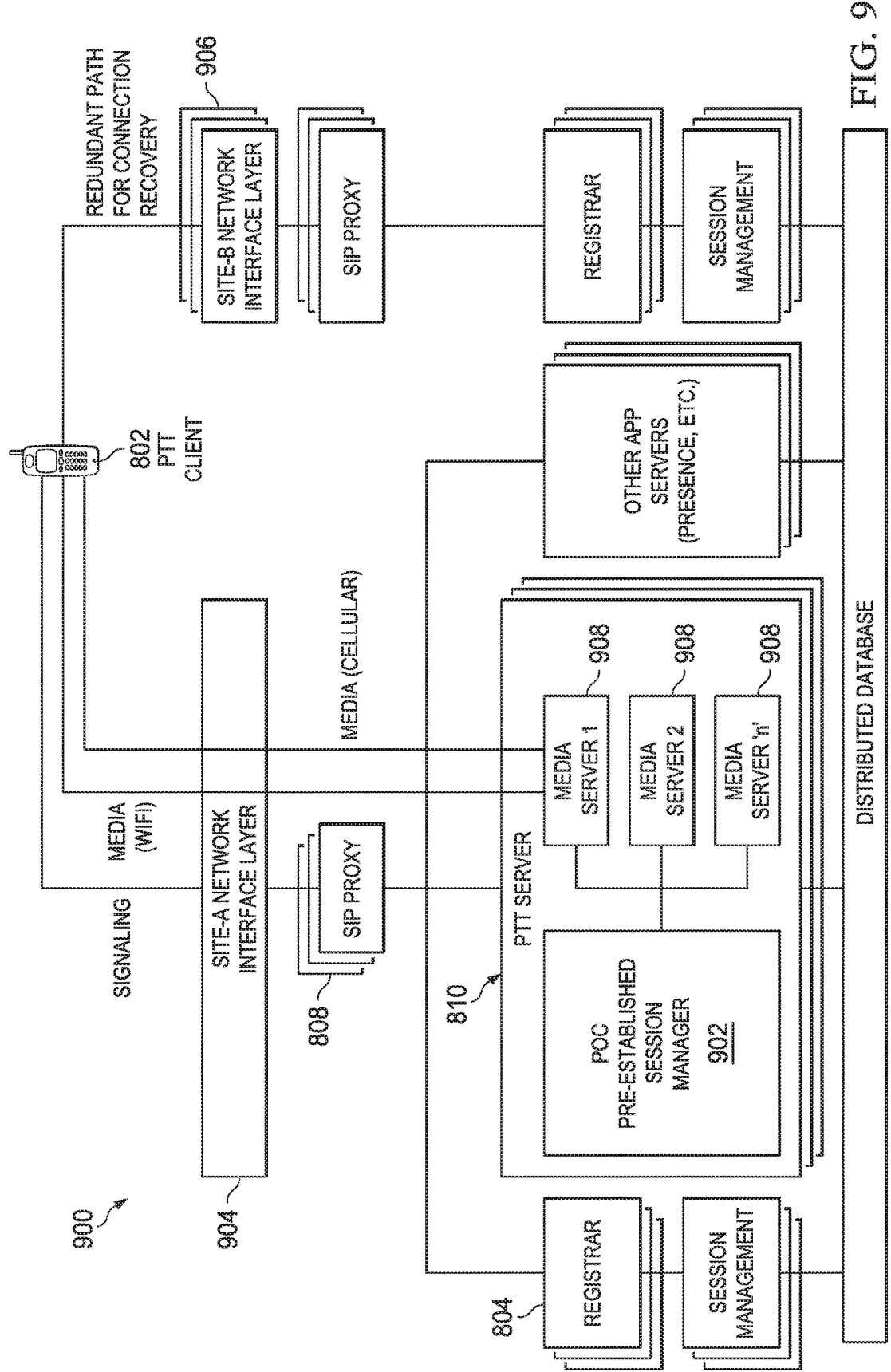

In some embodiments, each PTT call server has a dedicated pool of media servers for its exclusive use (e.g., media servers 908 in FIG. 9). To the extent possible, PTT call server places INVITE dialogs of all the clients belonging to a user affinity group on the same media server. However, if there are insufficient resources on the media server to accommodate the entire user affinity group, the PTT call server may spill over some of the INVITE dialogs to other media servers. In such embodiments, the PTT call server places a first portion of the INVITE dialogs on the media server and a second portion of the INVITE dialogs on different media servers.

In various embodiments, user affinity groups may be defined by an analytics system using the call logs provided by PTT call servers. User affinity groups may be computed by a user activity tracker system 812 using the call logs provided by various PTT call servers (including PTT call server 810). User activity tracker system 812 may be a virtual system (e.g., a service cluster), encapsulated in one or more containers, and deployed on a processor in a cloud system as described with respect to FIG. 2 above. For example, user activity tracker system 812 may assign PTT client 802 to a user affinity group having users, whom PTT client 802 is more likely to communicate with than other users belonging to other user affinity groups. PTT clients may be assigned to PTT user affinity groups based on one or more of: heuristic analysis of historic calling patterns of users and/or PTT group membership pattern of the users. For example, user affinity groups based on heuristic analysis of historic calling patterns may group users who call each other frequently (e.g., when a number of calls between users within a pre-defined time period exceed a threshold) are assigned to the same PTT user affinity group. As another example, user affinity groups based on group membership patterns may assign users who are members of a same pre-arranged PTT group to the same PTT user affinity group. In case of a conflict (e.g., a user meets qualifies more than one user affinity group), the user may be assigned to the PTT user affinity group in to which that user has a higher number of connections through group membership relations. Other user affinity group conflict resolution schemes may also be used.

Advantages of user affinity groups may be described with respect to FIG. 9. FIG. 9 may include some similar components as FIG. 8 where like reference numbers indicate like elements. FIG. 9 illustrates various connections between a PTT client 802 and PTT system components according to some embodiments. PTT client 802 may maintain one or more of the following communication paths with the PTT system: service signaling connection through a SIP proxy in any one of the PTT system's deployment sites (sometimes referred to as the primary deployment site 904), a session recovery notification connection through a SIP proxy in a different PTT system deployment site than primary deployment site 904 (referred to as geo-redundant deployment site 906), and at least one media path through each access network (e.g., WiFi and cellular) to a PTT media server 908 in primary deployment site 904. As described above with respect to FIG. 8, PTT media server 908 may be a dedicated media server of a PTT call server 810, which may be selected for PTT client 802 based on a user affinity group of PTT client 802.

Various embodiments may implement one or more strategies to speed up PTT session setup time. In an embodiment, regional affinity is used to decrease PTT setup time. For example, a PTT client is routed to a nearest PTT Server based on the location of the PTT client. This reduces the network round trip time between the PTT client and the PTT server at the time of PTT call setup. In an embodiment, regional affinity is achieved by configuring DNS-GSLB to direct the traffic to a geographically nearest deployment site based on the originating PTT client's IP address. In another embodiment, PTT clients are directed to a preferred deployment site using a static mapping of each client's location (e.g., cell location or GPS location co-ordinates) to specific deployment sites.

Furthermore, each PTT user affinity group may be assigned a preferred deployment site. The preferred deployment site may be a site having connections with a greatest number of users belonging a PTT user affinity group. At the time of login, clients belonging to a PTT user affinity group may be redirected to the preferred deployment site assigned to the PTT user affinity group by a registrar (e.g., registrar 804). In some embodiments, the deployment site of the user affinity group is selected (e.g., by user activity tracker system 812) so that the deployment site of the user affinity group is the same as a home site that would have otherwise been assigned to PTT clients independent of user affinity group association for a highest number of clients belonging to the user affinity group. For example, a potential deployment site is selected for each PTT client belonging to the PTT user affinity group. Selecting the potential deployment site may be independent from each PTT client's user affinity group association (e.g., based on geographic proximity, weighted round robin, or the like). After selecting the potential deployment sites, one of potential deployment sites selected for a greatest number of PTT clients belonging to the user affinity group is assigned to the user affinity group.

In another embodiment, clients belonging to a PTT user affinity group may be assigned to multiple different deployment site (e.g., based on a geographic load distribution policy). In such embodiments, a PTT call server at each deployment site is selected to server all PTT clients belonging to the PTT user affinity group and assigned to the site. Thus, PTT clients at different sites may be served by different PTT call server instances, but within a same deployment site, all PTT clients in a user affinity group are served by a same PTT call server.

In an embodiment, session stickiness is used to decrease PTT setup time. When a PTT client connects to a PTT server, the PTT client may need to retrieve a large quantity of data, such as, the PTT client's service profile, contact and group lists, user settings, and the like. Data retrieval may contribute to additional delays to session setup time. In some embodiments, this additional delay is avoided (or at least reduced) by using session stickiness to take advantage of database caching. The PTT user affinity group based load distribution logic described above may ensure that a PTT client is always re-connected to the same PTT server instance because all PTT clients of a user affinity group are served by a same PTT server. Thus, PTT user affinity groups may enforce session stickiness automatically to reduce additional delay.

In some embodiments, affinity and stickiness based session management policies may result in load skew. For example, some server instances may become more loaded than other server instances over time. In order to correct load skew resulting from embodiment stickiness/affinity policies, a PTT system (e.g., a service orchestrator of FIG. 2) may implement metrics based feedback loops on the analytics system, which reassigns one or more PTT user affinity groups from an overloaded server to a less loaded server when load skew is detected. These metrics are also used to identify when all available PTT call serves in the PTT system are approaching full capacity utilization level and automatically generate scale-up triggers to provision new PTT call server instances. In some embodiments, the metrics may include CPU utilization and/or RAM utilization. In some embodiments, the metrics used by the PTT platform may further include one or more of the following: PTT call setup latency, number of active pre-established PTT sessions, number of active PTT calls and call legs, number of media codec instances in active use, and the like.

In various embodiments, PTT user affinity groups may also improve PTT call service resilience. When a PTT call server takes over the ownership of a PTT user affinity group, the ownership is advertised to all peer PTT call servers by means of an entry in a shared database. Each client's connection/session state may also be recorded in a shared database so that other components are aware of the set of users being service by each component in the PTT system. Thus, when a component fails, active components can take-over stale sessions from a failed component based on information in the database.

Figure 10:
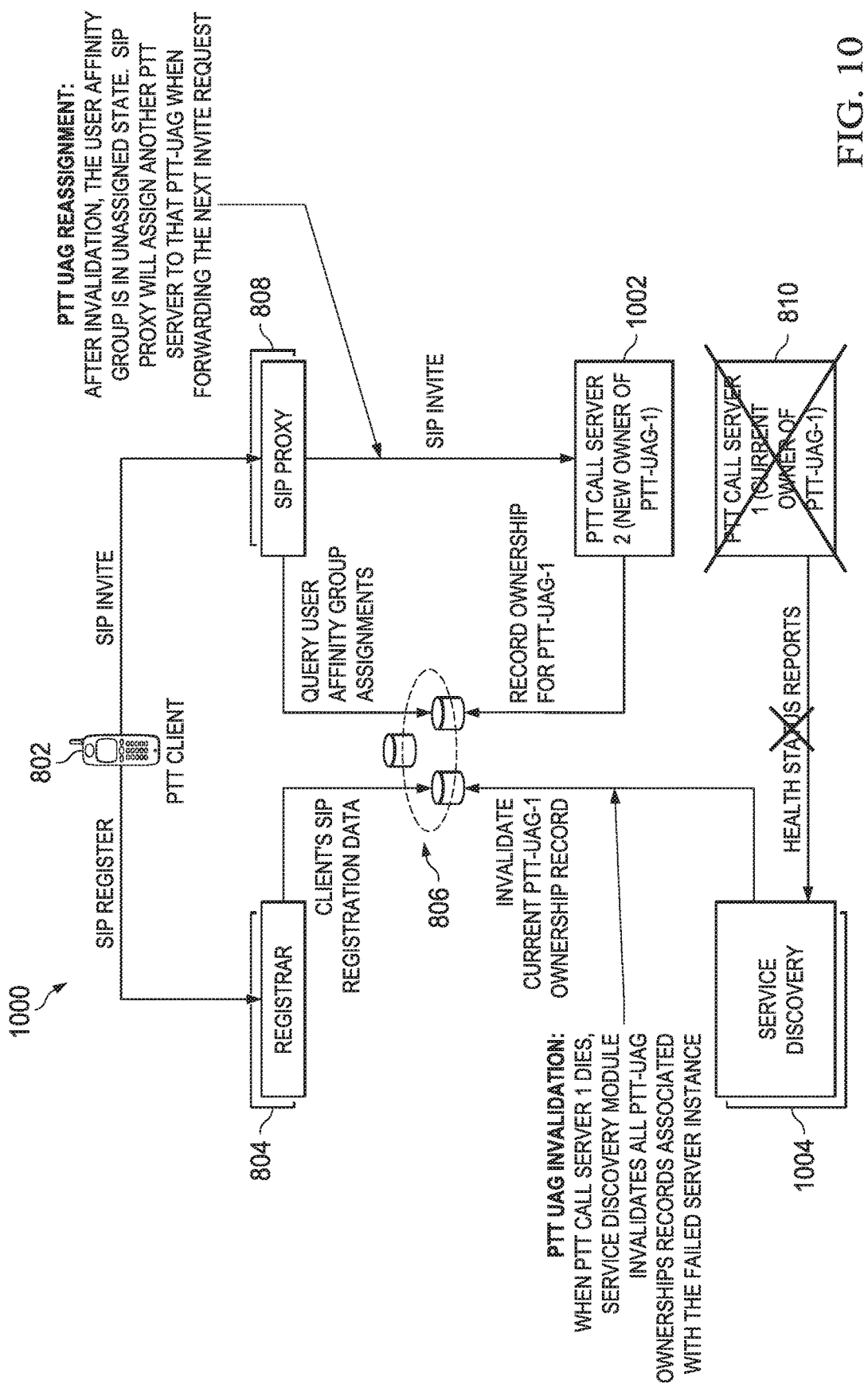

FIG. 10 illustrates block diagram 1000 of PTT call server recovery after failure. FIG. 10 may illustrate similar system components as FIG. 8 where like reference numerals indicate like elements. When a PTT Call Server (e.g., PTT call server 810) goes down, the user affinity groups served by PTT Call Server 810 are reassigned to a new PTT call server 1002. Failure of a PTT call server may be detected by service discovery module 1004 from health status monitors 1006 transmitted by each PTT call server (including PTT call server 810) in the system.

Furthermore, when a PTT call server instance (e.g., PTT call server 810) dies, its user affinity group ownership records are invalidated and all the user affinity groups managed by PTT call server 810 are now considered unassigned. Subsequently, when there is a new INVITE from/to a client belonging to an unassigned user affinity group (including the unassigned user affinity group resulting from the failure of PTT call server 810), SIP proxy 808 selects a PTT call server (e.g., PTT call server 1002) to service the unassigned user affinity group. For example, SIP proxy 808 may select a least loaded PTT call server to service the unassigned user affinity group as described above. PTT call server 1002 takes over the ownership of the user affinity group upon receiving the SIP INVITE.

After PTT call server 1002 takes over the ownership of a user affinity group, all INVITE sessions pertaining to the clients in the user affinity group are served by PTT call server 1002. If PTT call server 1002 finds that there is no active INVITE dialog when trying to initiate a call towards a PTT client, PTT call server 1002 may use a session recovery notification connection to trigger a new INVITE session setup by PTT client 802. In some embodiments, PTT call server 1002 may transmit the session recovery notification to PTT client 802 when the user affinity group is transferred to PTT call server 1002, when another PTT client attempts to call PTT client 802, or the like. To facilitate these triggers a PTT client may maintain at least two connection paths through different deployment sites with the notification service. In other embodiments, the PTT client may be capable of receiving unsolicited traffic from a PTT call server, and the PTT client may maintain fewer than two connection paths in such embodiments.

In some embodiments, PTT call server 1002 may implement event driven logic to send reconnect triggers to client to recover from stale sessions. For example, PTT call server 1002 sends a reconnect trigger to a PTT client when PTT call server 1002 is unable to find a connection for implementing a call with a PTT client having an unexpired SIP INVITE dialog. This event driven recovery approach ensures that network flooding due to aggressive reconnections is avoided or at least reduced when there are component failures. Furthermore, this event driven recovery logic may allow a load handled by the failed PTT call server 810 is evenly redistributed among the remaining available PTT call servers. Further, when a new PTT call server instance is created by the service orchestration layer (see FIG. 2) as a replacement for the failed instance, the event driven nature of this recovery mechanism ensures that the load is ramped up gradually in the new instance.

In the event of a failure of an entire deployment site, embodiment methods are applied for load re-distribution of various services to the other deployment sites. In an embodiment where regional affinity policy enforcement is prioritized, all PTT user affinity groups handled by the failed deployment site are reassigned to a same alternate deployment site. In another embodiment where minimizing hardware resources is the priority, PTT user affinity groups handled by the failed deployment site are distributed across all the remaining available deployment sites taking into consideration the available spare capacity of each deployment sites. When the failed deployment site has recovered and has been brought back into active service. The PTT user affinity groups served by the recovered deployment site prior to failure may be reassigned back to the recovered deployment site.

Figure 11:
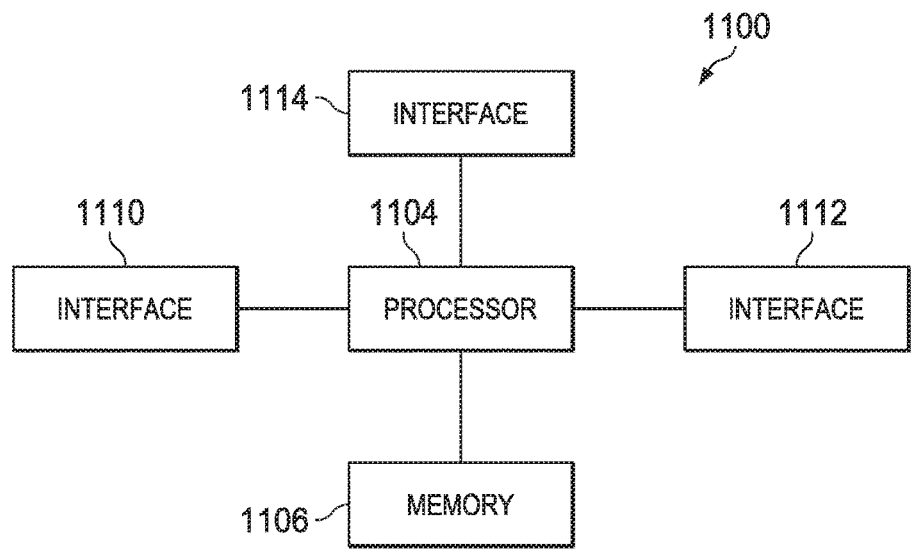
FIG. 11 illustrates a diagram of an embodiment processing system.

Thus, various embodiments described above provide a virtual implementation of PTT service components using container technology in a scalable system. User affinity groups may be implemented in the system. Each user affinity groups includes a group of users, which may communicate frequently with each other as determined by heuristic data of user call history, user call group membership, and the like. The user affinity groups provide various advantageous features, such as, decreased call session initiation times, increased resiliency, increased redundancy, and the like FIG. 11 illustrates a block diagram of an embodiment processing system 1100 for performing methods described herein, which may be installed in a host device. As shown, the processing system 1100 includes a processor 1104, a memory 1106, and interfaces 1110-1114, which may (or may not) be arranged as shown in FIG. 11. The processor 1104 may be any component or collection of components adapted to perform computations and/or other processing related tasks, and the memory 1106 may be any component or collection of components adapted to store programming and/or instructions for execution by the processor 1104. In an embodiment, the memory 606 includes a non-transitory computer readable medium. The interfaces 1110, 1112, 1114 may be any component or collection of components that allow the processing system 1100 to communicate with other devices/components and/or a user. For example, one or more of the interfaces 1110, 1112, 1114 may be adapted to communicate data, control, or management messages from the processor 1104 to applications installed on the host device and/or a remote device. As another example, one or more of the interfaces 1110, 1112, 1114 may be adapted to allow a user or user device (e.g., personal computer (PC), etc.) to interact/communicate with the processing system 1100. The processing system 1100 may include additional components not depicted in FIG. 11, such as long term storage (e.g., non-volatile memory, etc.).

In some embodiments, the processing system 1100 is included in a network device that is accessing, or part otherwise of, a telecommunications network. In one example, the processing system 1100 is in a network-side device in a wireless or wireline telecommunications network, such as a base station, a relay station, a scheduler, a controller, a gateway, a router, an applications server, or any other device in the telecommunications network. In other embodiments, the processing system 1100 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 12:
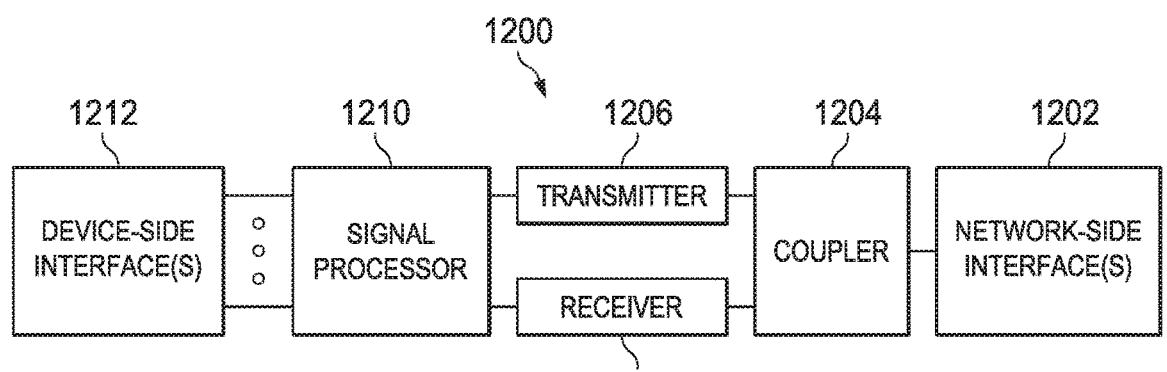
FIG. 12 illustrates a diagram of an embodiment transceiver.

In some embodiments, one or more of the interfaces 1110, 1112, 1114 connects the processing system 1100 to a transceiver adapted to transmit and receive signaling over the telecommunications network. FIG. 12 illustrates a block diagram of a transceiver 1200 adapted to transmit and receive signaling over a telecommunications network. The transceiver 1200 may be installed in a host device. As shown, the transceiver 1200 comprises a network-side interface 1202, a coupler 1204, a transmitter 1206, a receiver 1208, a signal processor 1210, and a device-side interface 1212. The network-side interface 1202 may include any component or collection of components adapted to transmit or receive signaling over a wireless or wireline telecommunications network. The coupler 1204 may include any component or collection of components adapted to facilitate bi-directional communication over the network-side interface 1202. The transmitter 1206 may include any component or collection of components (e.g., up-converter, power amplifier, etc.) adapted to convert a baseband signal into a modulated carrier signal suitable for transmission over the network-side interface 1202. The receiver 1208 may include any component or collection of components (e.g., down-converter, low noise amplifier, etc.) adapted to convert a carrier signal received over the network-side interface 1202 into a baseband signal. The signal processor 1210 may include any component or collection of components adapted to convert a baseband signal into a data signal suitable for communication over the device-side interface(s) 1212, or vice-versa. The device-side interface(s) 1212 may include any component or collection of components adapted to communicate data-signals between the signal processor 1210 and components within the host device (e.g., the processing system 1100, local area network (LAN) ports, etc.).

The transceiver 1200 may transmit and receive signaling over any type of communications medium. In some embodiments, the transceiver 1200 transmits and receives signaling over a wireless medium. For example, the transceiver 1200 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1202 comprises one or more antenna/radiating elements. For example, the network-side interface 1202 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1200 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

In accordance with an embodiment, a method includes receiving, by a first push-to-talk (PTT) service hosted on a processor, a session initiation request from a PTT client of a user and identifying, by the first PTT service, a user affinity group of the user. The user is assigned to the user affinity group in accordance with a prediction the user will communicate with first users in the user affinity group more frequently than second users in different user affinity groups. The method further includes determining, by the first PTT service, a PTT call server for the user affinity group. The PTT call server serves the user and the first users belonging to the user affinity group.

In an embodiment, the user is assigned to the user affinity group, by a user activity tracker system, in accordance with heuristic analysis of historic calling patterns of the user. The historic calling patterns are determined in accordance with call logs provided by a plurality of PTT call servers, wherein the PTT call server is one of the plurality of PTT call servers.

In another embodiment, the user is assigned to the user affinity group, by a user activity tracker system, in accordance with a group membership pattern of the user, and the user is assigned to a user affinity group having a higher number of connections through group membership relations when the user qualifies for more than one user affinity group.

In an embodiment, the PTT call server comprises a pool of dedicated media servers. The PTT call server places session initiation requests of the user and the first users belonging to the user affinity group on a same media server of the pool of dedicated media servers when the same media server comprises sufficient resources to accommodate all the session initiation requests. The PTT call server places a first portion of the session initiation requests of the user and the first users belonging to the user affinity group on the same media server of the pool of dedicated media servers and a second portion of the session initiation requests of the user and the first users belonging to the user affinity group on a different media server of the pool of dedicated media servers when the same media server does not comprise sufficient resources to accommodate all the session initial requests.

In an embodiment, determining the PTT call server for the user affinity group includes assigning the user affinity group to the PTT call server in accordance with processing loads of a plurality of PTT call servers at a deployment site, wherein the PTT call server is one of the plurality of PTT call servers. The processing loads may be determined in accordance with performance indicator metrics of the plurality of PTT call servers. The performance indicator metrics include PTT call setup latency, a number of active pre-established PTT sessions, a number of active PTT calls, a number of active PTT call legs, a number of media codec resources in active use, or a combination thereof.

In an embodiment, determining the PTT call server includes triggering creation of the PTT call server at a deployment site when none of PTT call servers at the deployment site have sufficient capacity for the user affinity group and assigning the user affinity group to the PTT call server.

In an embodiment, the method further includes reassigning the user affinity group to a different PTT call server when the PTT call server assigned to the user affinity group is overloaded.

In an embodiment, the method further includes receiving, by a second PTT service, a registration request from the PTT client and assigning, by the second PTT service, the PTT client to a first deployment site, wherein the first deployment site is one of a plurality of geographically diverse deployment sites of a PTT platform providing a PTT service to the user. Assigning the PTT client to the first deployment site is in accordance with a geographic proximity of the PTT client to the first deployment site or a weighted round robin scheme, wherein a weight assigned to each of the plurality of geographically diverse deployment sites is proportional to an available spare load bearing capacity of a respective one of the plurality of geographically diverse deployment sites. The method may further include redirecting the PTT client to a second deployment site of the user affinity group when the first deployment site is different than the second deployment site. The method may further include selecting potential deployment sites for each PTT client of the first users belonging to the user affinity group and assigning the second deployment site for the user affinity group. Selecting the potential deployment sites is independent from the user affinity group, and the second deployment site is one of the potential deployment sites selected for a greatest number of PTT clients of the first users belonging to the user affinity group. The method may further include reassigning the PTT client to a second deployment site when the first deployment site fails. The second deployment site is a different one of plurality of geographically diverse deployment sites than the first deployment site.

In an embodiment, the method further includes transmitting, by the PTT call server, a reconnect message to the PTT client to re-establish a pre-established PTT session when the PTT call server detects the PTT client is online and has no active pre-established PTT sessions. The PTT call server transmits the reconnect message to the PTT client when the user affinity group is assigned to the PTT call server. The PTT call server transmits the reconnect message when another PTT client makes a PTT call to the PTT client.

In accordance with another embodiment, a push-to-talk (PTT) platform component including: a processor and a computer readable storage medium storing programming for execution by the processor. The programming includes instructions to host a session initiation protocol (SIP) proxy service, receive a SIP invite request from a PTT client of a user, and identify a user affinity group of the user. The user is assigned to the user affinity group in accordance with a prediction the user will communicate with first users in the user affinity group more frequently than second users in different user affinity groups. The programming includes further instructions to determine a PTT call server for to the user affinity group. The PTT call server serves the user and the first users belonging to the user affinity group.

In an embodiment the user is assigned to the user affinity group, by a user activity tracker system, in accordance with heuristic analysis of historic calling patterns of the user, group membership patterns of the user, or a combination thereof.

In an embodiment, the PTT call server is a virtual PTT call service encapsulated in one or more containers and hosted on one or more processors.

In an embodiment, the instructions to determine the PTT call server includes further instructions to assign the user affinity group to the PTT call server in accordance with processing loads of a plurality of PTT call servers at a deployment site, wherein the PTT call server is one of the plurality of PTT call servers.

In accordance with yet another embodiment, a push-to-talk (PTT) platform includes a plurality of service clusters. Each of the plurality of service clusters provides a different function, and the plurality of service clusters includes a session initiation protocol (SIP) proxy service encapsulated in a first container cluster and hosted on one or more first processors. The sip proxy service is configured to receive a session initiation request from a PTT client of a user, identify a user affinity group of the user, and determine a first PTT call server for to the user affinity group. The first PTT call server serves all users belonging to the user affinity group and assigned to a deployment site where the first PTT call server is located. The PTT platform also includes a plurality of PTT call servers. Each PTT call server of the plurality of PTT call servers is encapsulated in a second container cluster and hosted on one or more second processors. The first PTT call server is one of the plurality of PTT call servers. The PTT platform also includes a user activity tracker encapsulated in a third container cluster and hosted on one or more third processors. The user activity tracker is configured to assign the user to the user affinity group. The PTT also includes a service orchestrator configured to scale a capacity of the PTT platform in accordance with one or more PTT service metrics.

In an embodiment, the service orchestrator automatically substitutes a malfunctioning container in the PTT platform with a new container.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed:

1. A method comprising:
  receiving, by a first push-to-talk (PTT) service hosted on a processor, a session initiation request from a PTT client of a user;
  identifying, by the first PTT service, a user affinity group of the user, wherein the user is assigned to the user affinity group in accordance with a prediction the user will communicate with first users in the user affinity group more frequently than second users in different user affinity groups; and
  determining, by the first PTT service, a PTT call server for the user affinity group, wherein the PTT call server serves the user and the first users belonging to the user affinity group, wherein the determining the PTT call server comprises creating a new PTT call server to serve as the PTT call server at a deployment site of the user affinity group when existing PTT call servers at the deployment site do not have sufficient capacity for the user affinity group; and
  assigning the user affinity group to the PTT call server.

2. The method of claim 1, wherein the user is assigned to the user affinity group, by a user activity tracker system, in accordance with heuristic analysis of historic calling patterns of the user.

3. The method of claim 2, wherein the historic calling patterns are determined in accordance with call logs provided by a plurality of PTT call servers, wherein the PTT call server is one of the plurality of PTT call servers.

4. The method of claim 1, wherein the user is assigned to the user affinity group, by a user activity tracker system, in accordance with a group membership pattern of the user.

5. The method of claim 4, wherein the user is assigned to a user affinity group having a higher number of connections to the user through group membership relations when the user qualifies for more than one user affinity group.

6. The method of claim 1, wherein the PTT call server comprises a pool of dedicated media servers, and wherein the PTT call server places session initiation requests of the user and the first users belonging to the user affinity group on a same media server of the pool of dedicated media servers when the same media server comprises sufficient resources to accommodate all the session initiation requests.

7. The method of claim 6, wherein the PTT call server places a first portion of the session initiation requests of the user and the first users belonging to the user affinity group on the same media server of the pool of dedicated media servers and a second portion of the session initiation requests of the user and the first users belonging to the user affinity group on a different media server of the pool of dedicated media servers when the same media server does not comprise sufficient resources to accommodate all the session initial requests.

8. The method of claim 1, wherein determining the PTT call server for the user affinity group comprises assigning the user affinity group to the PTT call server in accordance with processing loads of a plurality of PTT call servers at the deployment site, wherein the PTT call server is one of the plurality of PTT call servers.

9. The method of claim 8 further comprising determining the processing loads in accordance with performance indicator metrics of the plurality of PTT call servers, wherein the performance indicator metrics include PTT call setup latency, a number of active pre-established PTT sessions, a number of active PTT calls, a number of active PTT call legs, a number of media codec resources in active use, or a combination thereof.

10. The method of claim 1 further comprising reassigning the user affinity group to a different PTT call server when the PTT call server assigned to the user affinity group is overloaded.

11. The method of claim 1 further comprising:
receiving, by a second PTT service, a registration request from the PTT client; and
assigning, by the second PTT service, the PTT client to a first deployment site, wherein the first deployment site is one of a plurality of geographically diverse deployment sites of a PTT platform providing a PTT service to the user.

12. The method of claim 11, wherein assigning the PTT client to the first deployment site is in accordance with a geographic proximity of the PTT client to the first deployment site.

13. The method of claim 11, wherein assigning the PTT client to the first deployment site is in accordance with a weighted round robin scheme, wherein a weight assigned to each of the plurality of geographically diverse deployment sites is proportional to an available spare load bearing capacity of a respective one of the plurality of geographically diverse deployment sites.

14. The method of claim 11, further comprising redirecting the PTT client to a second deployment site of the user affinity group when the first deployment site is different than the second deployment site.

15. The method of claim 14, further comprising:
selecting potential deployment sites for each PTT client of the first users belonging to the user affinity group, wherein selecting the potential deployment sites is independent from the user affinity group; and
assigning the second deployment site for the user affinity group, wherein the second deployment site is one of the potential deployment sites selected for a greatest number of PTT clients of the first users belonging to the user affinity group.

16. The method of claim 11 further comprising reassigning the PTT client to a second deployment site when the first deployment site fails, wherein the second deployment site is a different one of plurality of geographically diverse deployment sites than the first deployment site.

17. The method of claim 1 further comprising, transmitting, by the PTT call server, a reconnect message to the PTT client to re-establish a pre-established PTT session when the PTT call server detects the PTT client is online and has no active pre-established PTT sessions.

18. The method of claim 17, wherein the PTT call server transmits the reconnect message to the PTT client when the user affinity group is assigned to the PTT call server.

19. The method of claim 17, wherein the PTT call server transmits the reconnect message when another PTT client makes a PTT call to the PTT client.

20. A push-to-talk (PTT) platform component comprising:
a processor; and
a computer readable storage medium storing programming for execution by the processor, the programming including instructions to:
host a session initiation protocol (SIP) proxy service;
receive a SIP INVITE request from a PTT client of a user;
identify a user affinity group of the user, wherein the user is assigned to the user affinity group in accordance with a prediction the user will communicate with first users in the user affinity group more frequently than second users in different user affinity groups;
determine a PTT call server for the user affinity group, wherein the PTT call server serves the user and the first users belonging to the user affinity group; and
in response to detecting an overload condition of the PTT call server, create a new PTT call server and assign one or more user affinity groups previously served by the PTT call server to the new PTT call server.

21. The PTT platform component of claim 20, wherein the user is assigned to the user affinity group, by a user activity tracker system, in accordance with heuristic analysis of historic calling patterns of the user, group membership patterns of the user, or a combination thereof.

22. The PTT platform component of claim 20, wherein the PTT call server is a virtual PTT call service encapsulated in one or more containers and hosted on one or more processors.

23. The PTT platform component of claim 20, wherein the instructions to determine the PTT call server comprises further instructions to assign the user affinity group to the PTT call server in accordance with processing loads of a plurality of PTT call servers at a deployment site, wherein the PTT call server is one of the plurality of PTT call servers.

24. The PTT platform of claim 20, wherein the instructions to determine the PTT call server further comprises instructions to:
create a first PTT call server that is previously non-existent; and
assign the user affinity group to the first PTT call server.

25. A method of operating a push-to-talk (PTT) platform comprising:
receiving, by a first PTT service hosted on a processor, a session initiation request from a PTT client of a user;
assigning, by the first PTT service, the user to a user affinity group, wherein the user is assigned to the user affinity group in accordance with a prediction the user will communicate with first users in the user affinity group more frequently than second users in different user affinity groups;
evaluating, by the first PTT service, capacities of existing PTT call servers at a deployment site of the user affinity group;

creating, by the first PTT service, a first new PTT call server when existing PTT call servers at the deployment site have insufficient capacity for the user affinity group; and transferring, by the first PTT service, the user affinity group to the first new PTT call server.

26. The method of claim 25, further comprising:

monitoring, by the first PTT service, a load of a first host of the first new PTT call server, wherein the first host comprises a first compute node; and in response to an overload of the first host, migrating the first new PTT call server to a second host different from the first host, wherein the second host comprises a second compute node.

27. The method of claim 25, further comprising:

creating, by the first PTT service, a new load balancer to support the first new PTT call server in tandem with creating the first new PTT call server.

* * * * *